US008704809B2

(12) United States Patent
Yamauchi

(10) Patent No.: US 8,704,809 B2
(45) Date of Patent: Apr. 22, 2014

(54) PIXEL CIRCUIT AND DISPLAY DEVICE

(75) Inventor: Yoshimitsu Yamauchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 77 days.

(21) Appl. No.: 13/375,614

(22) PCT Filed: Jun. 7, 2010

(86) PCT No.: PCT/JP2010/059636
§ 371 (c)(1),
(2), (4) Date: Dec. 1, 2011

(87) PCT Pub. No.: WO2010/143613
PCT Pub. Date: Dec. 16, 2010

(65) Prior Publication Data

US 2012/0075251 A1 Mar. 29, 2012

(30) Foreign Application Priority Data

Jun. 12, 2009 (JP) ................................ 2009-140833

(51) Int. Cl.
*G06F 3/038* (2013.01)
*G09G 5/00* (2006.01)

(52) U.S. Cl.
USPC ........................................... 345/204; 345/60

(58) Field of Classification Search
USPC ............ 345/76, 82, 88–89, 92, 98, 204–205, 345/211–212, 214, 690; 327/536
See application file for complete search history.

(56) References Cited

U.S. PATENT DOCUMENTS

| | | | | |
|---|---|---|---|---|
| 5,712,652 | A | 1/1998 | Sato et al. | |
| 6,278,426 | B1 * | 8/2001 | Akiyama | 345/87 |
| 6,529,180 | B1 * | 3/2003 | Ito et al. | 345/89 |
| 7,012,599 | B2 * | 3/2006 | Sun | 345/211 |
| 7,184,006 | B2 * | 2/2007 | Kim | 345/76 |
| 7,446,596 | B1 * | 11/2008 | Fort et al. | 327/536 |
| 2003/0016202 | A1 * | 1/2003 | Edwards et al. | 345/98 |

(Continued)

FOREIGN PATENT DOCUMENTS

| | | |
|---|---|---|
| CN | 101176141 | 5/2008 |
| JP | 61-069283 A | 4/1986 |

(Continued)

OTHER PUBLICATIONS

International Search Report and Written Opinion of the International Searching Authority.

*Primary Examiner* — William Boddie
*Assistant Examiner* — Amy C Onyekaba
(74) *Attorney, Agent, or Firm* — Harness, Dickey & Pierce, P.L.C.

(57) ABSTRACT

An embodiment of the present invention provides a liquid crystal display device. In each pixel circuit, a pixel electrode is connected to a source line via a third transistor. When a refreshing circuit performs a refreshing operation, a boosting signal line is supplied with a voltage pulse. If the pixel electrode is at a high voltage level at this time point, a voltage at a node is boosted and a first transistor turns ON to supply a refreshing voltage to the pixel electrode. If the pixel electrode is at a low voltage level, there is no boost, and the first transistor stays in OFF state, so a node assumes a voltage which is given by an off-resistance ratio of the first and the third transistors, and this voltage is supplied to the pixel electrode.

14 Claims, 12 Drawing Sheets

(56) References Cited

U.S. PATENT DOCUMENTS

| | | | | |
|---|---|---|---|---|
| 2004/0130544 | A1 | 7/2004 | Sun | |
| 2004/0252089 | A1* | 12/2004 | Ono et al. | 345/82 |
| 2006/0082566 | A1* | 4/2006 | Akimoto et al. | 345/204 |
| 2006/0232577 | A1* | 10/2006 | Edwards et al. | 345/211 |
| 2007/0040785 | A1* | 2/2007 | Edwards et al. | 345/92 |
| 2007/0075937 | A1* | 4/2007 | Kim | 345/76 |
| 2007/0103409 | A1* | 5/2007 | Kimura | 345/76 |
| 2008/0024481 | A1* | 1/2008 | Lee et al. | 345/212 |
| 2010/0039425 | A1* | 2/2010 | Chen et al. | 345/214 |
| 2010/0042346 | A1* | 2/2010 | Kuang | 702/65 |
| 2010/0045690 | A1* | 2/2010 | Handschy et al. | 345/549 |
| 2010/0134460 | A1* | 6/2010 | Hashimoto | 345/211 |
| 2010/0181180 | A1* | 7/2010 | Peter | 200/5 R |
| 2011/0032232 | A1* | 2/2011 | Smith | 345/211 |
| 2011/0199359 | A1* | 8/2011 | Kawabe | 345/211 |

FOREIGN PATENT DOCUMENTS

| | | | |
|---|---|---|---|
| JP | 61-074481 | A | 4/1986 |
| JP | 2004-212924 | A | 7/2004 |
| JP | 2005-018088 | A | 1/2005 |
| JP | 2006-343563 | A | 12/2006 |
| JP | 2007-502068 | A | 2/2007 |
| JP | 2007-334224 | A | 12/2007 |

* cited by examiner

| Counter AC Driving, Frame Inversion | | G(i) | S(j) | Vcom=CS | RL | BST | REF |
|---|---|---|---|---|---|---|---|
| Writing Period | Writing Operation | 8V | 0/5V | 0/5V | 5V | 0 | 8V |
| | Holding Operation | -5V | 0~5V | 0/5V | 5V | 0 | 8V |
| Self-Refreshing Period | Refreshing Operation | -5V | -5V | 0/5V | 5V | 5V | 3V |
| | Holding Operation | -5V | -5V | 0/5V | 5V | 0 | 3V |

PIXEL CIRCUIT AND DISPLAY DEVICE

TECHNICAL FIELD

The present invention relates to display devices, such as liquid crystal display devices, which are suitable for portable information terminals such as mobile phones. More specifically, the present invention relates to reduced power consumption when displaying still images in such display devices.

BACKGROUND ART

Portable information terminals such as mobile phones typically employ liquid crystal display devices as their display means. Also, since these mobile phones and others are battery-driven, reduced power consumption is an essential requirement. For this reason, permanent display contents (such as current time and battery status) are typically displayed in a reflective sub-panel. Also, as a recent trend, there is a demand for a main panel which is capable of handling both normal display and reflective permanent display.

Power consumption when driving a liquid crystal panel is primarily the amount of power consumed by a source driver serving as a data signal line driving circuit to drive source lines (data signal lines). The amount is given by the following expression:

$$P \propto f \cdot C \cdot V \cdot V \cdot n \cdot m \quad (1)$$

where P represents power consumption for driving the liquid crystal panel, f represents refreshing frequency, i.e., the number of refreshing (rewriting) procedures performed to a frame of pixel data per unit time. C represents a load capacitance driven by the source driver; V represents a drive voltage by the source driver; n represents a quantity of scanning lines; and m represents a quantity of source lines.

Contents of the permanent display are still images. In other words, the contents need not be updated. Based on this understanding, there is an attempt for further reduction of power consumption in the liquid crystal display device by decreasing the refreshing frequency for permanent display. However, decreasing the refreshing frequency results in creeping of pixel electrode potential due to leak current, etc. via switching elements such as thin-film transistors in the liquid crystal display device. Thus, as the refreshing frequency is decreased, display brightness in the pixels begins to creep, and these creeps are perceived as flickering. Another problem is that decreasing the refreshing frequency also decreases average electric potential in each frame period, which may lead to quality issues such as poor contrast.

Among many proposals currently made to achieve decrease in power consumption while avoiding these problems is a liquid crystal display device which includes a display unit provided with a memory section. The memory section digitally stores data which represents the image to be displayed. For example, Patent Literature 1 discloses a liquid crystal display device which includes an array substrate provided with a plurality of pixel groups arranged in a matrix pattern, and each pixel group is provided with a static memory. Such a liquid crystal display device as the above is capable of maintaining a constant pixel electrode potential without refreshing procedure, and therefore is capable of providing permanent display at low power consumption.

CITATION LIST

Patent Literature

Patent Literature 1: JP-A 2007-334224 Gazette

SUMMARY OF THE INVENTION

Problems to be Solved by the Invention

However, if the above arrangement is applied to liquid crystal display devices in mobile phones, etc., the device requires, in addition to voltage holding capacities (pixel capacities) for holding each pixel data in the form of analog information during normal operation, a memory for storing pixel data for each pixel group or each pixel. This means that additional circuit elements and signal lines must be formed on an array substrate (active matrix substrate) as constituent components of the display section in the liquid crystal display device, resulting in reduced aperture ratio in the transparent mode. Aperture ratio is reduced even further if the liquid crystals are AC driven and a polarity inversion drive circuit therefore is also formed together with the memories. Reduced aperture ratio as a result of increased number of circuit elements and signal lines causes decrease in brightness in the normal operation mode.

It is therefore an object of the present invention to provide a display device capable of sufficiently decreasing power consumption in permanent display of still images while avoiding poor display quality caused by flickering or decreased contrast, and while reducing decrease in the aperture ratio.

Means for Solving the Problems

A first aspect of the present invention provides a pixel circuit for formation of a pixel for an image to be displayed in a display device. The pixel circuit includes:

a first and a second active elements; and a predetermined electrode for formation of a capacitance for holding pixel data. In this display device, the predetermined electrode is connected to a predetermined first wiring via the first active element and to a control terminal of the first active element via the second active element;

the control terminal of the first active element has a capacitance coupling with a predetermined second wiring; and the second active element has a control terminal connected to a predetermined third wiring.

A second aspect of the present invention provides the pixel circuit according to the first aspect of the present invention, which further includes:

a third active element. In this display device, the display device includes a plurality of data signal lines and a plurality of scanning signal lines crossing the data signal lines;

the predetermined electrode is connected to one of the data signal lines via the third active element; and the third active element has a control terminal connected to one of the scanning signal lines.

A third aspect of the present invention provides the pixel circuit according to the first aspect of the present invention. In this display device, the predetermined electrode has a capacitance coupling with a predetermined fourth wiring.

A fourth aspect of the present invention provides a display device, which includes:

the pixel circuit according to the first aspect of the present invention provided for each pixel for an image to be displayed; and a plurality of data signal lines. In this display device, each pixel circuit is connected to one of the data signal lines; and the predetermined electrodes in the pixel circuits are arranged in a matrix pattern.

A fifth aspect of the present invention provides a display device, which includes:

the pixel circuit according to the first aspect of the present invention provided for each pixel for an image to be displayed; and a plurality of data signal lines. In this display device, the pixel circuit is connected to one of the data signal lines; and at least one of the first, the second and the third wirings is shared by a plurality of the pixel circuits.

A sixth aspect of the present invention provides an active matrix display device, which includes:

the pixel circuit according to the first aspect of the present invention provided for each pixel for an image to be displayed;

a plurality of data signal lines; and a plurality of scanning signal lines crossing the data signal lines. In this display device, the pixel circuit is connected to one of the scanning signal lines and to one of the data signal lines;

the pixel circuit further includes a third active element which has a control terminal connected to the scanning signal line; and the predetermined electrode in the pixel circuit is connected to the data signal line via the third active element.

A seventh aspect of the present invention provides the active matrix display device according to the fourth or the fifth aspect of the present invention. The display device further includes:

a plurality of scanning signal lines crossing the data signal lines. In this display device, the pixel circuit is connected to one of the scanning signal lines and to one of the data signal lines;

the pixel circuit further includes a third active element which has a control terminal connected to the scanning signal line; and the predetermined electrode in the pixel circuit is connected to the data signal line via the third active element.

An eighth aspect of the present invention provides the display device according to the sixth or the seventh aspect of the present invention. In this display device, at least one of the first, the second and the third wirings is shared by a plurality of the pixel circuits which are connected to a same scanning signal line.

A ninth aspect of the present invention provides the display device according to the fourth or the fifth aspect of the present invention. In this display device, at least one of the first, the second and the third wirings is shared by all of the pixel circuits.

A tenth aspect of the present invention provides the display device according to the sixth or the seventh aspect of the present invention. In this display device, at least one of the first, the second and the third wirings is shared by all of the pixel circuits.

An eleventh aspect of the present invention provides a display device, which includes:

the pixel circuit according to the first aspect of the present invention provided for each pixel for the image to be displayed; and a plurality of data signal lines. In this display device, the display device has a first operation mode for a voltage supply from the first wiring to the predetermined electrode;

the pixel circuit is connected to one of the data signal lines; and a predetermined voltage pulse is applied to the second wiring whereby the first active element makes the voltage supply if the second active element is turned OFF based on a voltage value of the predetermined electrode relative to a voltage of the third wiring, in the first operation mode.

A twelfth aspect of the present invention provides the display device according to the fourth, the fifth or the ninth aspects of the present invention. In this display device, the display device has a first operation mode for a voltage supply from the first wiring to the predetermined electrode;

the pixel circuit is connected to one of the data signal lines; and a predetermined voltage pulse is applied to the second wiring whereby the first active element makes the voltage supply if the second active element is turned OFF based on a voltage value of the predetermined electrode relative to a voltage of the third wiring, in the first operation mode.

A thirteenth aspect of the present invention provides the display device according to one of the sixth through the eighth, and the tenth aspects of the present invention. In this display device, the display device has a first operation mode for a voltage supply from the first wiring to the predetermined electrode;

the pixel circuit is connected to one of the data signal lines; and a predetermined voltage pulse is applied to the second wiring, whereby the first active element makes the voltage supply if the second active element is turned OFF based on a voltage value of the predetermined electrode relative to a voltage of the third wiring, in the first operation mode.

A fourteenth aspect of the present invention provides the display device according to one of the eleventh through the thirteenth aspects of the present invention.

In the first operation mode:

a predetermined voltage pulse is applied to the second wiring, whereby the first active element is turned on or off depending on a voltage value of the predetermined electrode relative to a voltage of the third wiring; and the predetermined electrode is supplied with a voltage of the first wiring via the first active element when the first active element is turned on.

A fifteenth aspect of the present invention provides the display device according to one of the eleventh through the thirteenth aspects of the present invention. In this display device, the voltage pulse is applied to all of the second wirings simultaneously, whereby these first active elements make the voltage supply if their second active elements are turned OFF based on a voltage value of the corresponding predetermined electrode relative to a voltage of the third wiring, in the first operation mode.

A sixteenth aspect of the present invention provides the display device according to the thirteenth aspect of the present invention. In this display device, the second wiring is provided for each scanning signal line; and application of the voltage pulse to the second wiring is performed selectively in batch per scanning signal line, whereby respective first active elements make the voltage supply if their second active elements are turned OFF based on a voltage value of the corresponding predetermined electrodes relative to a voltage of the relevant third wirings.

A seventeenth aspect of the present invention provides the display device according to one of the eleventh through the fourteenth aspects of the present invention. In this display device, the voltage of the second wiring when the voltage pulse application is not performed is lower than when the voltage pulse application is performed if the first active element is provided by an N-channel transistor, whereas the voltage of the second wiring when the voltage pulse application is not performed is higher than when the voltage pulse application is performed if the first active element is provided by a P-channel transistor.

An eighteenth aspect of the present invention provides the display device according to the seventeenth aspect of the present invention. In this display device, voltage settings for the first wiring, for the second wiring including settings for the voltage pulse, and for the third wiring are so made that the first active element turns on upon presence of the voltage pulse applied to the second wiring while the first active element turns off upon absence of the voltage pulse applied to the second wiring if the predetermined electrode is supplied with a voltage which lies within a predetermined range set around a reference voltage given by the third wiring, and that the first active element is turned off regardless of the voltage pulse application to the second wiring if the predetermined electrode is supplied with a voltage which lies out of the said predetermined range but lies within a different predetermined range.

A nineteenth aspect of the present invention provides the display device according to one of the eleventh through the eighteenth aspects of the present invention. In this display device, the third wiring is supplied with a predetermined voltage which is not higher than an upper limit nor lower than a lower limit of a voltage to be supplied to the predetermined electrode for the capacitance to hold pixel data, in the first operation mode.

A twentieth aspect of the present invention provides the display device according to one of the sixth through the eighth, and the tenth aspects of the present invention. In this display device, the display device has a first operation mode for a voltage supply from the first wiring to the predetermined electrode.

In the first operation mode:

a deactivation signal is supplied to the scanning signal line connected to the control terminal of the third active element, whereby the third active element is turned off; and the data signal lines has a predetermined fixed voltage.

A twenty-first aspect of the present invention provides the display device according to the twentieth aspect of the present invention. In this display device, the predetermined electrode is supplied with a voltage which is given by a proportional division of a difference between a voltage of the first wiring and the said predetermined voltage by an off resistance of the first active element and an off resistance of the third active element if the first active element is turned off, in the first operation mode.

A twenty-second aspect of the present invention provides the display device according to the twenty-first aspect of the present invention. In this display device, the said predetermined voltage is set to a voltage value which satisfies a condition that a voltage value given by a proportional division of a difference between a voltage of the first wiring and the said predetermined voltage by an off resistance of the first active element and an off resistance of the third active element is approximately equal to the lowest of the voltages which must be supplied to the predetermined electrode in order for the capacitance to hold pixel data.

A twenty-third aspect of the present invention provides the display device according to the twenty-second aspect of the present invention. In this display device, the said predetermined voltage is set to a voltage value which satisfies a condition that a voltage value given by a proportional division of a difference between a voltage of the first wiring and the said predetermined voltage by an off resistance of the first active element and an off resistance of the third active element is approximately equal to zero.

A twenty-fourth aspect of the present invention provides the display device according to one of the sixth through the eighth, the tenth, the thirteenth, and the twentieth through the twenty-third aspects of the present invention. In this display device, the display device has a second operation mode for supplying the predetermined electrode with data signal which indicates a pixel to be formed by the pixel circuit.

In the second operation mode:

an activation signal is supplied to the scanning signal line connected to the control terminal of the third active element, whereby the third active element is turned on; and the predetermined electrode is supplied with the data signal via the data signal line and the third active element when the third active element is in an on state.

A twenty-fifth aspect of the present invention provides the display device according to the twenty-fourth aspect of the present invention. In this display device, the third wiring is supplied with a voltage for turning on the second active element regardless of a voltage supplied to the predetermined electrode, in the second operation mode.

A twenty-sixth aspect of the present invention provides the display device according to the twenty-fourth aspect of the present invention. In this display device, the third wiring is supplied with a voltage for turning off the second active element regardless of a voltage supplied to the predetermined electrode, in the second operation mode.

A twenty-seventh aspect of the present invention provides the display device according to one of the sixth through the eighth, the tenth, the thirteenth, and the twentieth through the twenty-sixth aspects of the present invention. In this display device, the display device has a third operation mode for replacing the voltage of the predetermined electrode so that polarity of the voltage applied to the capacitance for holding the pixel data is inverted; and the scanning signal lines are driven so that the polarity is inverted, and the predetermined electrodes are supplied with voltages of the inverted polarity via the data signal lines, in the third operation mode.

A twenty-eighth aspect of the present invention provides the display device according to the twenty-seventh aspect of the present invention. In this display device, The predetermined electrodes are supplied with the voltages of the inverted polarity via the data signal lines so that the voltages have a same polarity within a given frame, in the third operation mode.

A twenty-ninth aspect of the present invention provides the display device according to the twenty-seventh or the twenty-eighth aspect of the present invention. In this display device, the display device has a first operation mode for a voltage supply from the first wiring to the predetermined electrode;

the pixel circuit is connected to one of the data signal lines;

a predetermined voltage pulse is applied to the second wiring in the first operation mode, whereby the first active element makes the voltage supply if the second active element is turned OFF based on a voltage value of the predetermined electrode relative to a voltage of the third wiring; and a time interval for the polarity inversion in the third operation mode is longer than ten times of a time interval for the voltage pulse application in the first operation mode.

A thirtieth aspect of the present invention provides the display device according to the twenty-seventh or the twenty-eighth aspect of the present invention. In this display device, the predetermined electrodes are supplied with pixel data stored in a predetermined memory as a representation of at least one frame-full of image data, as voltages of the inverted polarity via the data signal lines and the third active elements, in the third operation mode.

A thirty-first aspect of the present invention provides a display device, which includes:

the pixel circuit according to the first aspect of the present invention provided for each pixel for an image to be displayed;

a plurality of scanning signal lines;

a plurality of data signal lines crossing the scanning signal lines; and a fourth wiring. In this display device, the pixel circuit is connected to one of the scanning signal lines and to one of the data signal lines; and the fourth wiring has a capacitance coupling with the predetermined electrodes in all of the pixel circuits.

A thirty-second aspect of the present invention provides the display device according to one of the sixth through the thirtieth aspects of the present invention. In this display device, the display device further includes a fourth wiring; and the fourth wiring has a capacitance coupling with the predetermined electrode in all of the pixel circuits.

A thirty-third aspect of the present invention provides a display device, which includes:

the pixel circuit according to the first aspect of the present invention provided for each pixel for each image to be displayed;

a plurality of scanning signal lines;

a plurality of data signal lines crossing the scanning signal lines; and a fourth wiring provided for each of the scanning signal lines. In this display device, the pixel circuit is connected to one of the scanning signal lines and to one of the data signal lines; and each fourth wiring has a capacitance coupling with each predetermined electrode in those pixel circuits connected to the scanning signal line which corresponds to the said fourth wiring.

A thirty-fourth aspect of the present invention provides the display device according to one of the sixth through the eighth, the tenth, the thirteenth, and the twentieth through the thirtieth aspects of the present invention. In this display device, the display device further includes a fourth wiring provided for each of the scanning signal lines; and each fourth wiring has a capacitance coupling with each predetermined electrode in those pixel circuits connected to the scanning signal line which corresponds to the said fourth wiring.

Advantages of the Invention

According to the first aspect of the present invention, a control terminal of the first active element is supplied with a voltage in accordance with a voltage of the predetermined electrode which forms a capacitance for holding pixel data, via the second active element. If the voltage of the predetermined electrode is within a predetermined range set around a voltage of the third wiring, the second active element assumes an OFF state, and when a predetermined voltage pulse is applied to the second wiring, the voltage of the control terminal changes (typically the voltage rises) to turn ON the first active element. As the first active element turns ON, a voltage of the first wiring is supplied to the predetermined electrode via the first active element. Based on these operations described above, it is possible to refresh the voltage of the predetermined electrode. In conventional refreshing in a liquid crystal display device, a voltage which has a different polarity from the polarity of a voltage held in a pixel capacitance as pixel data is written as pixel data. According to the present invention, however, refreshing means that a voltage of the same polarity as before is written again as pixel data to the capacitance formed by the predetermined electrode. With such a refreshing procedure as described, it is now possible, for example, that even if there is voltage creep caused in the predetermined electrode by leak current after the predetermined electrode is supplied with a desired voltage, a desired voltage can be supplied from the first wiring via the first active element by applying a voltage pulse to the second wiring as far as the creeping voltage stays within the predetermined range. With the refreshing operation as described, it is now possible in display devices which use the pixel circuit according to the present invention, to reduce power consumption for displaying still images by increasing polarity inversion interval in liquid crystal display while reducing decrease in display quality. Since the above-described refreshing operation requires only a simple configuration, it is possible to reduce decrease in aperture ratio in comparison to conventional arrangements which rely on memories provided in the display section to display still images with reduced power consumption in a permanent display mode in mobile phones, etc.

According to the second aspect of the present invention, the third active element is turned ON by applying an activation signal to a scanning signal line which is connected to the control terminal of the third active element, whereby a voltage is supplied to the predetermined electrode from the data signal line which is connected to the third active element. In other words, it is now possible to write pixel data to the pixel circuit via the data signal line and the third active element.

According to the third aspect of the present invention, the predetermined electrode for formation of the capacitance for holding pixel data is capacitance-coupled with the fourth wiring. Therefore, it is possible, by supplying the fourth wiring with a predetermined voltage, to stably maintain the voltage which has been supplied as pixel data from the data signal line to the predetermined electrode.

According to the fourth aspect of the present invention, each of the predetermined electrodes arranged in the matrix pattern is included in one of the pixel circuits, and by supplying these circuits with pixel data voltages via the data signal lines, each pixel circuit forms a pixel in accordance with the given voltage, whereby image display is achieved.

According to the fifth aspect of the present invention, at least one of the first, the second and the third wirings is shared by a plurality of the pixel circuits. Therefore, it is possible to supply these pixel circuits with a predetermined voltage or voltage pulse commonly and simultaneously via this at least one wiring.

The sixth and the seventh aspects of the present invention provide the same advantages as the second aspect of the present invention since whichever of the proposed active matrix display devices is constituted by using the pixel circuit that has the same configuration as the pixel circuit according to the second aspect of the present invention.

According to the eighth aspect of the present invention, at least one of the first, the second and the third wirings is shared by a plurality of the pixel circuits connected to the same scanning signal line. Therefore, it is possible to supply these pixel circuits with a predetermined voltage or voltage pulse commonly and simultaneously via this at least one wiring, in batch per scanning signal line.

In whichever of the ninth and the tenth aspects of the present invention, at least one of the first, the second and the third wirings is shared by all of the pixel circuits. Therefore, it is possible to supply all of the pixel circuits with a predetermined voltage or voltage pulse commonly and simultaneously via this at least one wiring.

In whichever of the eleventh through the thirteenth aspects of the present invention, a predetermined voltage pulse is applied to the second wiring in the first operation mode, whereby the first active element makes voltage supply from the first wiring to the pixel electrode if the second active element is turned OFF based on a voltage value of the predetermined electrode relative to a voltage of the third wiring. Therefore, it is possible to suppress voltage creep in the predetermined electrode caused by leak current. As a result, it is now possible to reduce power consumption in displaying still images by increasing polarity inversion interval in liquid crystal display while reducing decrease in display quality.

According to the fourteenth aspect of the present invention, a predetermined voltage pulse is applied to the second wiring in the first operation mode, whereby the first active element is turned ON or OFF depending on a voltage of the predetermined electrode relative to a voltage of the third wiring. If the first active element is turned ON, a voltage of the first wiring is supplied to the predetermined electrode, and therefore, it is possible to suppress voltage creep in the predetermined electrode caused by leak current. As a result, it is now possible to reduce power consumption for displaying still images by increasing polarity inversion interval in liquid crystal display while reducing decrease in display quality.

According to the fifteenth aspect of the present invention, a voltage pulse is applied simultaneously to all of the second wirings in the first operation mode. Therefore, a refreshing operation, i.e. voltage supply from the first wiring to the predetermined electrode by the first active element in accordance with a voltage value of the predetermined electrode relative to a voltage of the third wiring, takes place collectively for all of the pixel circuits. The arrangement makes it possible to generate the voltage pulse for the refreshing operation with a simple configuration.

According to the sixteenth aspect of the present invention, a voltage pulse is applied selectively to the second wirings in batch per scanning signal line, in the first operation mode. Therefore, a refreshing operation, i.e. voltage supply from the first wiring to the predetermined electrode by the first active element in accordance with a voltage value of the predetermined electrode relative to a voltage of the third wiring, takes place in batch of the pixel circuits belonging to one scanning signal line as a unit. For this reason, the arrangement decreases peak current due to the refreshing operation in comparison to the collective refreshing described above.

According to the seventeenth aspect of the present invention, if the first active element is provided by an N-channel transistor, the voltage of the second wiring when the voltage pulse application is not performed is lower than when the voltage pulse application is performed, and thus, the voltage pulse applied to the second wiring causes the above-described refreshing to take place. If the first active element is provided by a P-channel transistor, the voltage of the second wiring when the voltage pulse application is not performed is higher than when the voltage pulse application is performed, and thus, the voltage pulse applied to the second wiring causes the above-described refreshing to take place.

According to the eighteenth aspect of the present invention, if the predetermined electrode is supplied with a voltage which lies within a predetermined range set around a reference voltage given by the third wiring, the second active element is turned OFF and the first active element is turned ON when the voltage pulse is applied to the second wiring, to supply the predetermined electrode with the voltage of the first wiring. On the other hand, if the voltage pulse is not applied to the second wiring or if the predetermined electrode is supplied with a voltage which lies out of the above-mentioned predetermined range but lies within a different predetermined range, the first active element is turned OFF, and therefore, the voltage of the first wiring is not supplied to the predetermined electrode, so there is no voltage change in the predetermined electrode.

According to the nineteenth aspect of the present invention, in the first operation mode, the voltage of the third wiring is the predetermined voltage which is not higher than an upper limit nor lower than a lower limit of the voltage that must be applied to the predetermined electrode in order to make the capacitance in the pixel circuit hold pixel data. Since the third wiring has such a voltage setting as described, even if there is voltage creep in the predetermined electrode caused by leak current after the predetermined electrode is supplied with a pixel data voltage, the voltage pulse application to the second wiring boosts the control terminal potential in the first active element as far as the creeping voltage stays within a predetermined range based on the voltage of the third wiring. Thus, it is possible to refresh the voltage of the predetermined electrode by supplying the voltage of the first wiring to the predetermined electrode.

According to the twentieth aspect of the present invention, the voltage of each data signal line is fixed to a predetermined value in the first operation mode. This suppresses operation by the data signal line driving circuit, keeping output buffers and other components in the data signal line driving circuit to stay in a deactivated state, leading to remarkable reduction in power consumed by the display device.

According to the twenty-first aspect of the present invention, in the first operation mode, if the first active element is turned off, the predetermined electrode is supplied with a voltage which is given by a proportional division of a difference between a voltage of the first wiring and the said predetermined voltage by an off resistance of the first active element and an off resistance of the third active element, i.e. an off-resistance-division voltage is supplied to the predetermined electrode. The arrangement makes it possible to maintain the voltage of the predetermined electrode at the voltage obtained by this off-resistance-division voltage. If the predetermined electrode is supplied with a voltage approximately equal to the off-resistance-division voltage of the voltages to be supplied to the predetermined electrode, there is little creep in the voltage of the predetermined electrode.

According to the twenty-second aspect of the present invention, the voltage to be supplied from the data signal line to the predetermined electrode in order to make the capacitance in the pixel circuit hold pixel data lies within a range of 0 volt to a predetermined positive voltage value. In the first operation mode, the off-resistance-division voltage is set to a voltage value (the predetermined voltage) which is approximately equal to the lowest of the voltages to be supplied to the predetermined electrode. Therefore, the arrangement makes it possible to maintain the voltage of the predetermined electrode closely to the voltage which was supplied from data signal line to the predetermined electrode, by supplying a voltage(s) which are not the lowest of those voltages to be supplied to the predetermined electrode from the first wiring, and supplying the lowest (voltage approximately equal thereto) of the voltages from a connection point between the first active element and the third active element, in the first operation mode.

According to the twenty-third aspect of the present invention, the off-resistance-division voltage approximately equals to zero, in the first operation mode. Therefore, the arrangement makes it possible to maintain the voltage of the predetermined electrode closely to the voltage which was supplied from data signal line to the predetermined electrode, by supplying a non-near-zero voltage(s) of the voltages to be supplied to the predetermined electrode from the first wiring, and supplying the voltage which is approximately zero volt from a connection point between the first active element and the third active element, in the first operation mode.

According to the twenty-fourth aspect of the present invention, in the second operation mode, data signal is supplied to the predetermined electrode via the data signal line and the third active element whereby data is written from the data signal line to the pixel circuit when the third active element is in ON state.

According to the twenty-fifth aspect of the present invention, the second active element is in ON state, so the control terminal of the first active element is supplied with the voltage of the predetermined electrode, which prevents the first active element from turning ON. Thus, the pixel circuit operates in a conventional manner, and data signal is supplied from the data signal line to the predetermined electrode.

According to the twenty-sixth aspect of the present invention, the second active element is in OFF state in the second operation mode. Thus, by setting the control terminal voltage of the first active element not to turned ON regardless of the voltage of the predetermined electrode, it becomes possible to let the pixel circuit operate in a conventional manner to supply data signal from the data signal line to the predetermined electrode.

According to the twenty-seventh aspect of the present invention, in the third operation mode, a voltage of inverted polarity is supplied to the predetermined electrode via the data signal line so that the voltage to be applied to the capacitance to hold pixel data will have an inverted polarity. Therefore, the arrangement provides image display by AC drive, for example in order to prevent display quality of liquid crystal display devices from being reduced due to ion accumulation on the electrode side, premature deterioration of the liquid crystal, etc. which are caused by DC voltage application to the liquid crystal.

According to the twenty-eighth aspect of the present invention, all voltages applied to the capacitances for holding pixel data have the same polarity within the same frame in the third operation mode, and polarity inversion interval for the data signals is long. This makes possible to reduce power consumption.

According to the twenty-ninth aspect of the present invention, the time interval for the polarity inversion in the third operation mode is longer than ten times the time interval for voltage pulse application to the second wiring in the first operation mode. This makes it possible to drastically reduce occasions for driving data signal lines and other components to perform polarity inversion in liquid crystal display while suppressing voltage creep in the predetermined electrode caused by leak current. As a result, it is now possible to make sufficient reduction of power consumption in displaying (permanent display of) still images while avoiding poor display quality caused by flickering or decreased contrast.

According to the thirtieth aspect of the present invention, pixel data which is stored in a predetermined memory is supplied as the above-described polarity-inverted voltages to the predetermined electrode via the data signal line, etc., in the third operation mode. Therefore, the polarity inversion can be implemented without providing a separate polarity inversion circuit.

In whichever of the thirty-first and the thirty-second aspects of the present invention, the predetermined electrode for formation of the capacitance for holding pixel data is capacitance-coupled with the fourth wiring. Therefore, by supplying the fourth wiring with a predetermined voltage, it is possible to stably hold the voltage which was captured in the pixel circuit as pixel data from the data signal line. Also, if this arrangement is applied to a liquid crystal display device in which the liquid crystal is sandwiched by the predetermined electrode and the counter electrode opposed thereto, the voltage of the counter electrode may be fixed, with the voltage of the fourth wiring changed. This also improves display quality while reducing power consumption.

In whichever of the thirty-third and the thirty-fourth aspects of the present invention, the predetermined electrode for formation of the capacitance for holding pixel data is capacitance-coupled with the fourth wiring. Therefore, by supplying the fourth wiring with a predetermined voltage, the arrangement makes it possible to stably hold the voltage captured as pixel data in the pixel circuit from the data signal line.

MODE FOR CARRYING OUT THE INVENTION

Hereinafter, embodiments of the present invention will be described with reference to the attached drawings.

1. First Embodiment

<1.1 Configuration of Liquid Crystal Display Device>

Figure 1:
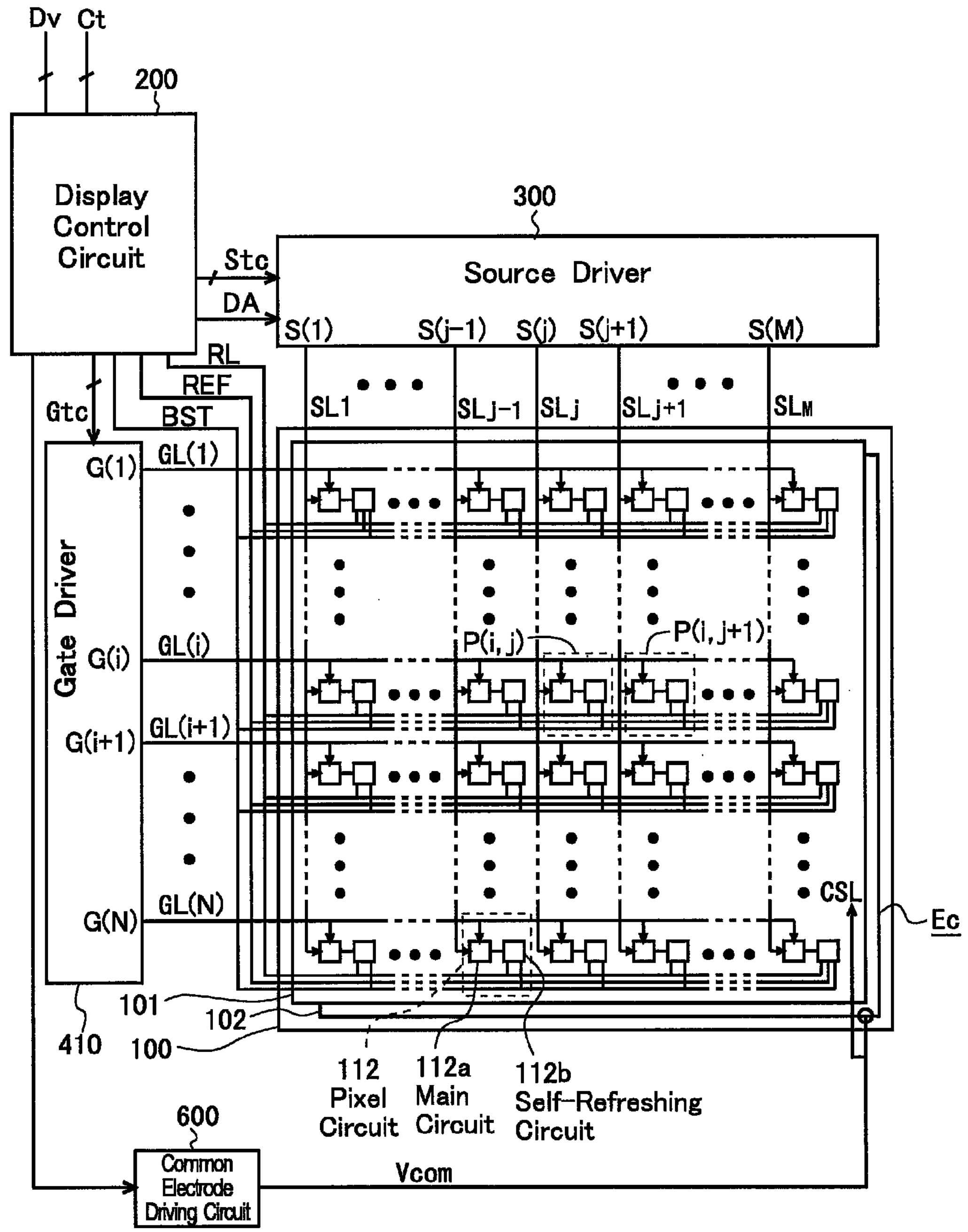
FIG. 1 is a block diagram showing an overall configuration of a liquid crystal display device according to a first embodiment of the present invention.
Figures 2, 3:
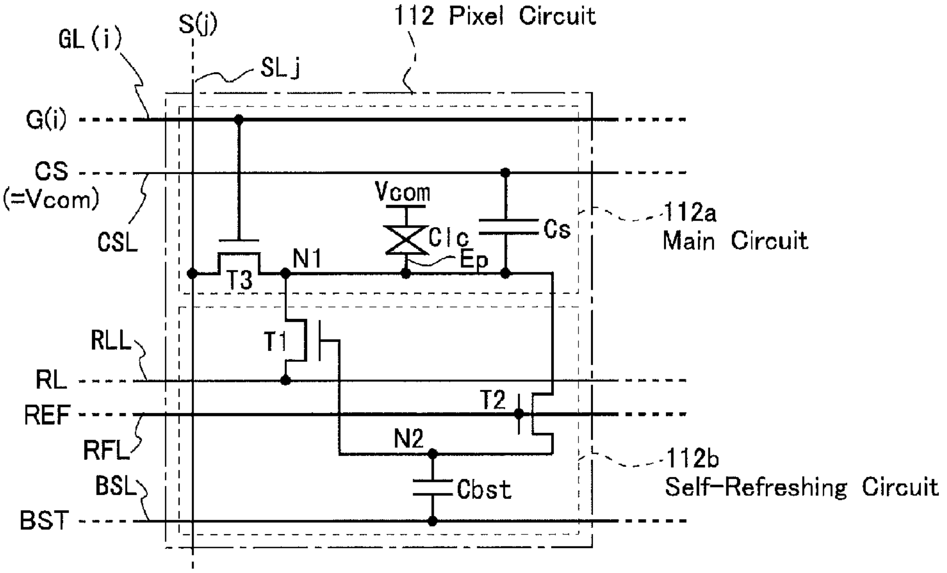
FIG. 2 is a circuit diagram showing a configuration of a pixel circuit according to the first embodiment.
FIG. 3 is a chart showing operating conditions for a writing period and a self-refreshing period in a permanent display mode according to the first embodiment.

FIG. 1 is a block diagram showing a configuration of a liquid crystal display device according to a first embodiment of the present invention. FIG. 2 is a circuit diagram showing a configuration of a pixel circuit 112 according to the embodiment. The liquid crystal display device according to the present embodiment has a transparent, normal display mode, and a reflective, permanent display mode. The permanent display mode has a writing mode, a refreshing mode and a polarity inverting mode. The normal display mode is an operation mode employed in normal use, e.g., for movie display when this liquid crystal display device is incorporated in a mobile phone and is required to operate in a transparent mode, whereas the permanent display mode is an operation mode when still images are displayed in a reflective mode under low power consumption. Note, however, that the present invention is not limited to such an application and/or configuration as the above.

As shown in FIG. 1, the liquid crystal display device according to the present embodiment includes an active matrix display section 100 utilizing an active matrix substrate 101; a source driver 300 as a data signal line driving circuit; a gate driver 410 as a scanning signal line driving circuit; a common electrode driving circuit 600; and in addition, a display control circuit 200 for controlling the source driver 300, the gate driver 410 and the common electrode driving circuit 600. It should be noted here that although FIG. 1 shows the source driver 300, the gate driver 410 and the common electrode driving circuit 600 as separate constituent elements from the active matrix substrate 101 in the display section 100, part or all of these may be formed on the active matrix substrate 101, integrally with the pixel circuit 112. This also applies to other embodiments.

The display section 100 in the liquid crystal display device is constituted by a pair of electrode substrates which sandwich a liquid crystal layer. Each electrode substrate has a polarization plate attached to its outer surface. One of the electrode substrates is the active matrix substrate 101. As shown in FIG. 1 and FIG. 2, the active matrix substrate 101 is an insulating substrate made of glass for example, which is formed with a plurality (N) of gate lines GL(1) through GL(N) as scanning signal lines; a plurality (N) of CS lines as auxiliary capacitance lines each corresponding to one of the gate lines GL(1) through GL(N); a plurality (M) of source lines SL1 through SLM as data signal lines each crossing each of the gate lines GL(1) through GL(N); and a plurality (N times M) of the pixel circuits 112 arranged in a matrix pattern so that each corresponds to one of the intersections made by the gate lines GL(1) through GL(N) and the source lines SL1 through SLM. In the present embodiment, the CS lines are connected to each other. Thus, they will be represented by a single reference symbol "CSL", and hereinafter, a voltage applied to the CS lines CSL will be represented by a reference symbol "CS". In the present embodiment, the CS lines CSL are given a common voltage Vcom (CS=Vcom) which will be described later.

In the configuration described above, each of the pixel circuits 112 corresponds to one of the gate lines GL(1) through GL(N), and one of the source lines SL1 through SLM; each pixel circuit 112 is connected with the corresponding gate line GL(i) and the corresponding source line SLj, as well as with one of the CS lines CSL which corresponds to the gate line GL(i). As shown in FIG. 2, each pixel circuit 112 includes a main circuit 112*a* which has essentially the same configuration as a pixel circuit in conventional liquid crystal display devices, and a self-refreshing circuit 112*b*.

The main circuit 112*a* in the pixel circuit 112 has a pixel electrode Ep, and a thin-film transistor T3 having its gate terminal connected to the corresponding gate line GL(i) and serving as an active element. The thin-film transistor T3 serves as a switching element. The pixel electrode Ep is connected to the corresponding source line SLj via the thin-film transistor T3.

Also, as shown in FIG. 1 and FIG. 2, the active matrix substrate 101 is further formed with a refreshing data line RLL, a reference line RFL, and a boosting signal line BSL along each of the gate lines GL(1) through GL(N). As shown in FIG. 1, the refreshing data lines RLL formed along the respective gate lines GL(i) are connected with each other, and then with the display control circuit 200. Likewise, the boosting signal lines BSL formed along the respective gate lines GL(i) are connected with each other, and then with the display control circuit 200. Further, the reference lines RFL formed along the respective gate lines GL(i) are also connected with each other, and then with the display control circuit 200.

The other one of the electrode substrates in the display section 100 is called counter substrate 102, and the present counter substrate 102 is a transparent, insulating substrate made of glass for example, having its entire surface formed with a common electrode (also called "counter electrode") Ec. The common electrode Ec is formed commonly to the plurality (N times M) of pixel circuits 112, and is opposed to the plurality of pixel electrodes Ep in the pixel circuits 112 via the liquid crystal layer. With the above, each pixel circuit 112 in the active matrix substrate 101 constitutes a pixel formation section, with its common electrode Ec which is a shared electrode, as well as with the liquid crystal layer. In this pixel formation section, the pixel electrode Ep and the common electrode Ec constitute a liquid crystal capacitance Clc. Also, in order to achieve assured holding of a voltage in the liquid crystal capacitance Clc, an auxiliary capacitance element Cs is formed in parallel to the liquid crystal capacitance Clc. Specifically, in the active matrix substrate 101, the CS lines CSL and the pixel electrodes Ep which are opposed thereto with an insulation film, etc. in between constitute the auxiliary capacitance elements Cs. Therefore, the liquid crystal capacitance Clc and the auxiliary capacitance element (hereinafter also called "auxiliary capacitance") Cs constitute a capacitance where a data signal S(j) as a pixel data is to be written and stored (and hereinafter, this capacitance will be called "pixel capacitance" and represented with a symbol "Cp"). Specifically, by using these symbols "Cp", "Clc" and "Cs" also as representations of capacitance values, the following expression is true: Cp=Clc+Cs. Hereinafter, the liquid crystal capacitance Clc will also be included in the pixel circuit 112 when describing operations, etc. of the pixel circuit 112.

In each pixel circuit 112 in the active matrix substrate 101, the main circuit 112*a* mentioned earlier receives and holds a data signal S(j) as pixel data. On the other hand, the self-refreshing circuit 112*b* functions as an active pull-up circuit for performing refreshing operations to be described later. The self-refreshing circuit includes a thin-film transistor (hereinafter called "first transistor") T1 as a first active element; a thin-film transistor (hereinafter called "the second transistor") T2 as a second active element; and a boosting capacitance element Cbst. The boosting capacitance element Cbst has a capacitance value which is sufficiently smaller than a capacitance value of the pixel capacitance Cp which is made of the auxiliary capacitance element Cs and the liquid crystal capacitance Clc (Cbst<<Cp).

The main circuit 112*a* has an active element provided by a thin-film transistor (hereinafter called "the third transistor") T3, which has a connecting point (hereinafter called "node N1") with the pixel electrode Ep, and this node is connected to the refreshing data line RLL via the first transistor T1 of the self-refreshing circuit 112*b* whereas the first transistor T1 has its gate terminal connected to an end of the boosting capacitance element Cbst (hereinafter a node including this end will be called "node N2"). The earlier-mentioned end (node N2) of the boosting capacitance element Cbst is connected to the pixel electrode Ep via the second transistor T2, whereas the other end of the boosting capacitance element Cbst is connected to the boosting signal lines BSL. The second transistor T2 has its gate terminal connected to the reference line RFL.

As shown in FIG. 1 and FIG. 2, the pixel electrode Ep in each pixel circuit 112 receives an electric potential in accordance with an image to be displayed, from the source driver 300 and the gate driver 410 whose operations will be described later, whereas the common electrode Ec receives a common potential Vcom generated by the common electrode driving circuit 600 (the common potential Vcom is also called "counter voltage" or "common voltage"). Thus, a voltage in accordance with a potential difference between the pixel electrode Ep and the common electrode Ec is applied to the liquid crystal. The applied voltage controls the amount of light passing through the liquid crystal layer, thereby achieving an image display. Note, however, that polarization plates are utilized to control the amount of light passed upon voltage application to the liquid crystal layer. In the liquid crystal display device according to the present embodiment, polarization plates constitute a normally black configuration.

In the present embodiment, the common voltage Vcom is not a fixed value but takes alternating values, i.e. a predetermined H level value (5 volts) and a predetermined L level value (0 volt), which are generated by the common electrode driving circuit 600 (method of driving the common electrode (counter electrode) Ec in such a manner as described here by the common voltage Vcom is called "counter AC driving"). More specifically, the common voltage Vcom is generated to alternate between the predetermined H level and the predetermined L level for each horizontal period in the normal display mode, while in the permanent display mode, to alternate between the predetermined H level and the predetermined L level for each period which is equal to the frame period multiplied by an integer. In the permanent display mode hereinafter, the common voltage Vcom will alternate between the predetermined H level and the predetermined L level for each p frame periods (p represents an integer not smaller than two, typically being in a range from several tens through several hundreds).

In the normal display mode in the present embodiment, the source lines SL1 through SLM, gate lines GL(1) through GL(N) and the common electrode Ec are driven in such a way that polarity of the voltage applied to the liquid crystal will be inverted for each frame period, as well as inverted for each display line (for each scanning line) in each frame. Specifically, in a horizontal period where the common voltage Vcom takes the predetermined L level, a positive voltage is applied to the pixel liquid crystal (pixel capacitance Clc) in each pixel circuit 112 as a result of the above-described driving operation to give each pixel electrode Ep a voltage which represents pixel data via the source line SLj. Also, in a horizontal period where the common voltage Vcom takes the predetermined H level, a negative voltage is applied to the pixel liquid crystal in each pixel circuit 112 as each pixel electrode Ep is given a voltage which represents pixel data via each source line SLj. Then, polarity of the voltage applied to the pixel liquid crystal in each pixel circuit 112 is inverted for each frame period. On the other hand, as will be described later, in the writing period of the permanent display mode in the present embodiment, the source lines SL1 through SLM, the gate lines GL(1) through GL(N) and the common electrode Ec are driven in such a way that polarity of the voltage applied to the liquid crystal will be inverted for each p frame periods (p is an integer not smaller than two). Specifically, in a frame period where the common voltage Vcom takes the predetermined L level, a positive voltage is applied to the pixel liquid crystal (pixel capacitance Clc) in each pixel circuit 112 as a result of the above-described driving operations to give each pixel electrode Ep a voltage which represents pixel data via the source line SLj. Also, in a frame period where the common voltage Vcom takes the predetermined H level, a negative voltage is applied to each pixel liquid crystal in each pixel circuit 112 as each pixel electrode Ep is given a voltage which represents pixel data via each source line SLj.

The display control circuit 200 receives a data signal Dv which represents an image to be displayed, and a timing signal Ct, from an outside signal source; and then generates the following signals based on these signals Dv and Ct for displaying the image in the display section 100: a digital image signal DA and a data-line timing control signal Stc to be supplied to the source driver 300; a scanning-line timing control signal Gtc to be supplied to the gate driver 410; a common voltage control signal to be supplied to the common electrode driving circuit 600; and a boosting signal BST, a reference voltage REF and a refreshing voltage RL to be supplied to the boosting signal lines BSL, the reference lines RFL and the refreshing data line RLL respectively in the active matrix substrate 101. It should be noted here that the refreshing voltage RL in the present embodiment is equal to the relatively higher one (5 volts) of the two voltages (5 volts and 0 volt) which are supplied to the pixel electrode Ep in two-tone image display.

The source driver 300 in the normal display mode generates, based on the digital image signal DA and the data-line timing control signal Stc, analog voltages which represent pixel values for one display line of the image represented by the digital image signal DA, as data signals S(1) through S(M)

for each horizontal period (for each 1H), and applies these data signals S(1) through S(M) to the respective source lines SL1 through SLM. On the other hand, in the permanent display mode, the source driver 300 generates voltages which take one of two values instead of the analog voltages, as the data signals S(1) through S(M) for each horizontal period, and applies these data signals S(1) through S(M) to the respective source lines SL1 through SLM (details to be described later).

In the normal display mode according to the present embodiment, the data signals S(1) through S(M) are outputted in such a way that polarity of the voltage applied to the liquid crystal layer is inverted for each frame period, as well as for each display line in each frame (hereinafter this method will be called "line inversion driving"). Therefore, the source driver 300 inverts the polarity (determined with reference to the common voltage Vcom) of the data signal S(j) which is applied to each source line SLj, for each horizontal period in the normal display mode. On the other hand as will be described later, in the writing period in the permanent display mode according to the present embodiment, data signals S(1) through S(M) are outputted in such a way that polarity of the voltage applied to the liquid crystal layer is inverted for each p frame periods (p represents an integer not smaller than two), in such a way that the voltages applied to the pixel liquid crystals based on the pixel data written to the respective pixel circuits 112 in each frame period have the same polarity within the same frame (hereinafter this method will be called "frame inversion driving"). Therefore, during the writing period of the permanent display mode, the source driver 300 inverts polarity (determined with reference to the common voltage Vcom) of the data signal S(j) which is applied to each source line SLj for each p frame periods.

The gate driver 410 selects the gate lines GL(1) through GL(N) sequentially for substantially one horizontal period based on the scanning-line timing control signal Gtc in each frame period (each vertical scanning period) of the digital image signal DA, for writing of data signals S(1) through S(M) to the respective pixel circuits 112.

Hence, as the source lines SL1 through SLM, the gate lines GL(1) through GL(N) and the common electrode Ec (CS lines CSL) are driven in the manner as described above, each pixel data, which is a constituent data of the image data that represent the image to be displayed, is supplied to the corresponding pixel circuit 112 as the data signal S(j), whereby light transmission ratio in the liquid crystal is controlled, resulting in display of the image. More specifically in the present embodiment, full-color movies and still images are displayed in the normal display mode whereas still images in limited colors, i.e. multi-colored still images, are displayed in the permanent display mode.

<1.2 Operations in Permanent Display Mode>

Figure 4:
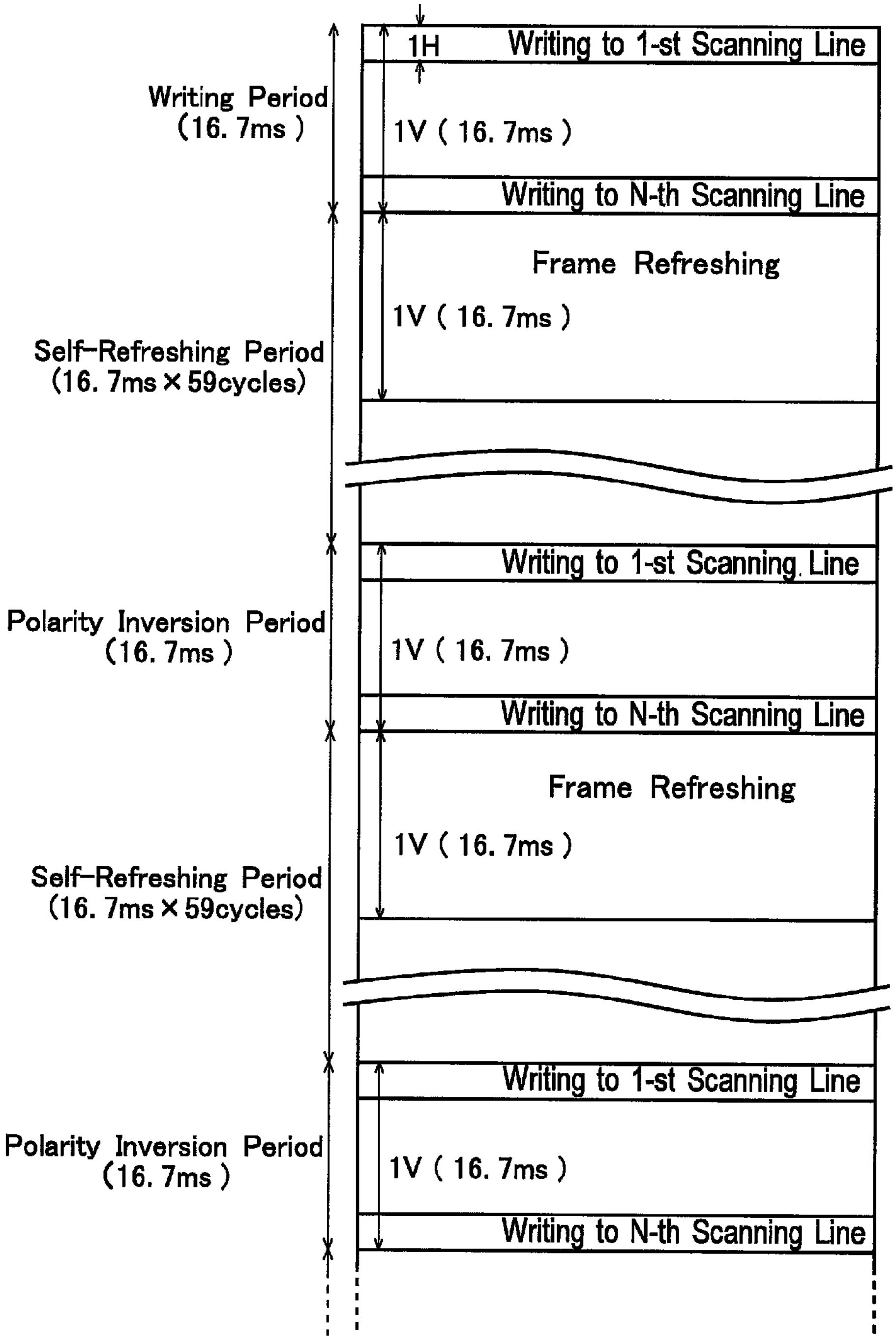
FIG. 4 is a timing block diagram for describing operating periods involved in the permanent display mode according to the first embodiment.

FIG. 3 is a chart showing operating conditions in the permanent display mode in the present embodiment. FIG. 4 is a timing block diagram for describing operating periods in the permanent display mode in the liquid crystal display device according to the present embodiment. When operation shifts from the normal display mode to the permanent display mode in the present embodiment, first, pixel data constituting a still image to be displayed is written to each corresponding pixel circuit 112 (i.e. to pixel capacitance Cp thereof) in the form of two-value data (the same applies to all of the variations). Hereinafter, this writing operation will be called "permanent display mode writing operation". On the other hand, writing operation in the normal display mode to give pixel data which constitutes an image to be displayed to each corresponding pixel circuit 112 (i.e. to pixel capacitance Cp thereof) will be called "normal display mode writing operation". However, a simple term of "writing operation" will be used when there is no room for confusion, e.g. when context gives a clear indication which mode is being discussed, or when there is no need for differentiating between the two writing modes. Also, a period during which the permanent display mode writing operation is performed will be called "permanent display mode writing period" or simply "writing period", whereas an operation mode for the permanent display mode writing period will be called "writing mode". In the permanent display mode writing period, pixel data for one display line is written to the pixel circuits 112 for each horizontal period (also called "1H period"), and therefore writing of pixel data for one screen is completed in one vertical period (also called "1V period" or 1 frame period").

Figure 5:
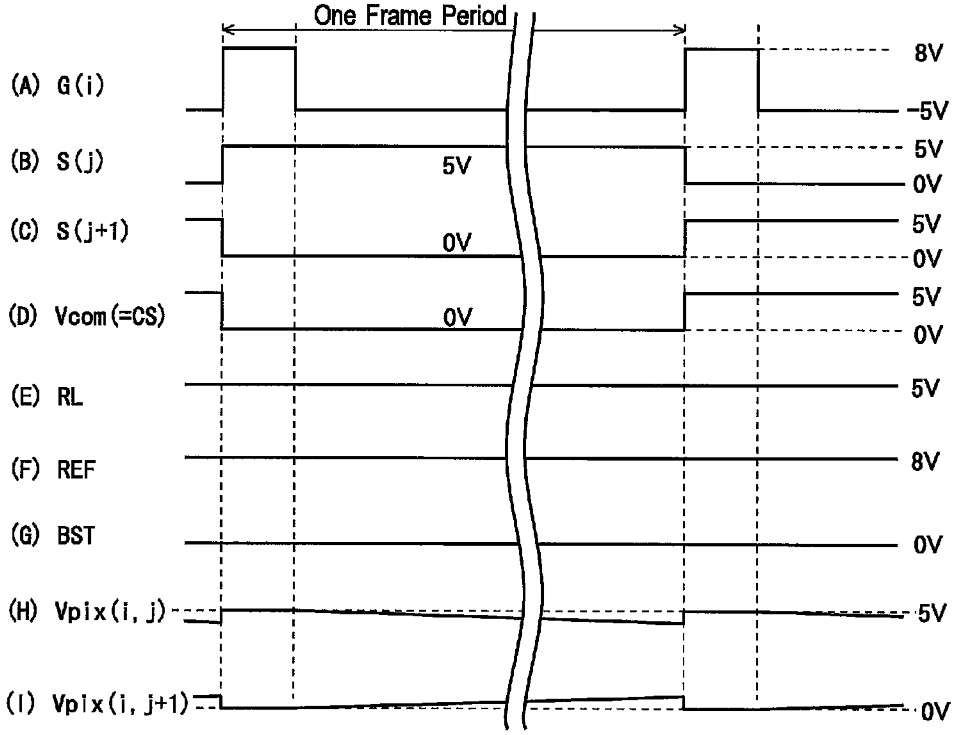
FIG. 5 shows a signal waveform charts (A through I) for describing operations in a writing period in the permanent display mode according to the first embodiment.

FIG. 5 shows a signal waveform charts for describing operations in the permanent display mode writing period in the present embodiment. In the permanent display mode, each pixel can only take either one of the two displays, black display or white display. The term "black display" is a state of blocking light, i.e. Turn-OFF state whereas "white display" is a state of allowing light to pass through, i.e. Turn-ON state. Therefore, "white display" includes, for example, those states where red, green or blue light can pass through. In the permanent display mode of the present embodiment, pixel liquid crystals representing those pixels for black display receive a low voltage V1 or −V1 whereas pixel liquid crystals representing those pixels for white display receive a high voltage V2 or −V2. Under these operating presumptions, operating conditions in the present embodiment are as shown in FIG. 3, with V1=0V, and V2=5V. However, the present invention is not limited to these operating conditions. Operating conditions for the present invention may be whatsoever, as long as they are adequate for a liquid crystal display device in which the present invention is embodied, with a set of appropriate conditions covering such a characteristic as relationship between voltage applied to the liquid crystal and brightness.

In the permanent display mode writing period according to the present embodiment, a scanning signal G(i) as shown in FIG. 5(A) is applied to each gate line GL(i) (i=1 through N), whereby sequential selection is made to the gate lines GL(1) through GL(N). On the other hand, the source lines SL1 through SLM receive data signals S(1) through S(M) as shown in FIGS. 5(B) and (C) which represent the image to be displayed. Each pixel circuit 112 has its third transistor T3 turned ON if its corresponding gate line GL(i) is in the selected state (i.e. during the time when the scanning signal G(i) assumes an activated state or H level). Under this state, a voltage of the corresponding source line SLj is supplied to the pixel electrode Ep via the third transistor T3. As a result, data signal S(j) in the form of the voltage of the source line SLj is written as pixel data, to the corresponding pixel capacitance Cp associated with the pixel electrode Ep.

This voltage of the data signal S(j) is held until a new data signal S(j) is written to the pixel capacitance Cp in the next frame period. In the above-described process, the liquid crystal receives a voltage which is equal to the difference between an electric potential of the pixel electrode Ep representing the voltage of the data signal S(j) and the common potential Vcom, whereby light transmissivity in the liquid crystal is controlled. It should be noted here that in the permanent display mode, pixel data (data signal S(j)) which is written to each pixel circuit 112 is two-value data.

In the pixel data writing operation in the normal display mode as well as in the permanent display mode, the reference line RFL is supplied with a voltage which always turns ON the second transistor T2 regardless of the voltage given to the pixel electrode Ep, whereby the first transistor T1 is prevented from being turned ON regardless of whether the boosting signal BST is active or not (regardless of whether or not a voltage pulse is applied to the boosting signal line BSL). Thus, the self-refreshing circuit 112*b* does not operate. However, this is not the only way to prevent the self-refreshing circuit 112*b* from operating at the time of pixel data writing operation. One alternative, for example, is to give the reference lines RFL a reference voltage REF which always turns OFF the second transistor T2 regardless of the voltage supplied to the pixel electrode Ep in the pixel data writing operation, and apply a low voltage to the boosting signal lines BSL, so that the first transistor T1 is kept in OFF state. This arrangement also keeps the self-refreshing circuit 112*b* deactivated. Another alternative is to supply the reference line RFL with a voltage which always turns OFF the second transistor T2 regardless of the voltage given to the pixel electrode Ep in the pixel data writing operation, change the voltage of the node N2 (the gate terminal of the first transistor T1) to turn ON the first transistor T1 immediately before the second transistor T2 is turned OFF, and keep the boosting signal BST deactivated. This arrangement also keeps the self-refreshing circuit 112*b* deactivated.

Figure 6:
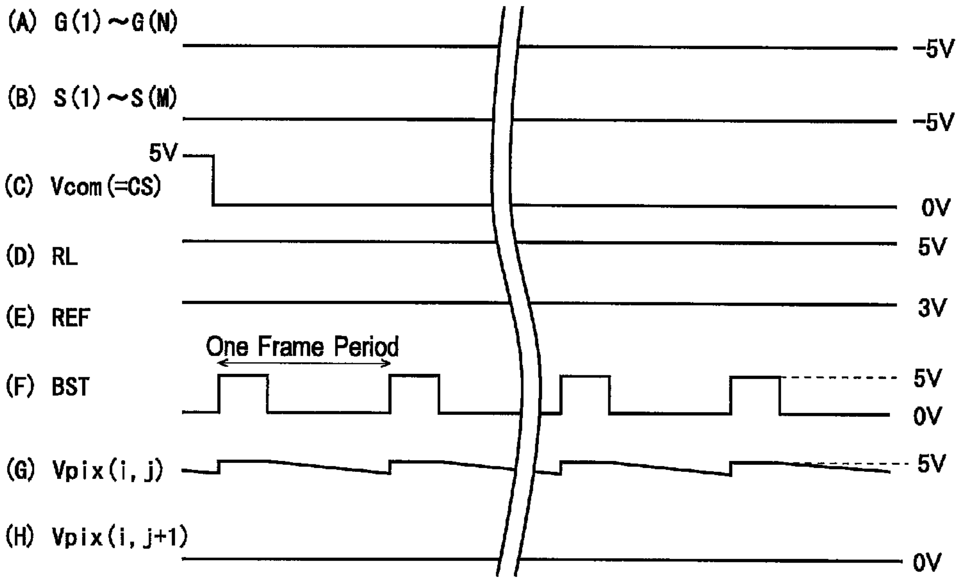
FIG. 6 shows a signal waveform charts (A through H) for describing operations in a self-refreshing period in the permanent display mode according to the first embodiment.

As shown in FIG. 4, in the permanent display mode, the writing mode comes to an end when the writing operations for one frame are completed. Then, the self-refreshing period starts to perform a refreshing operation to suppress voltage creep (caused by leak current) in the pixel electrode Ep in each pixel circuit 112. The operation mode for the self-refreshing period will be called "refreshing mode". FIG. 6 shows signal waveform charts for describing the refreshing operation. FIG. 3 lists voltage values of each signal as operating conditions in the self-refreshing period where the refreshing operation is performed, together with operation conditions for the writing period. Hereinafter, the pixel circuit 112 may be denoted by using a reference symbol "P(i, j)" when it is necessary to clarify the location of the pixel circuit: The "pixel circuit P(i, j)" means a pixel circuit 112 which is connected to the i-th gate line GL(i) and the j-th source line SLj (see FIG. 1). Also, a voltage at the pixel electrode Ep in the pixel circuit P (i, j) (hereinafter this voltage will also be called "pixel voltage") will be denoted by using a symbol "Vpix(i, j)" or "Vpix" (see FIGS. 5(H) and (I); FIGS. 6(G) and (H)).

As shown in FIG. 6(E), in the self-refreshing period, the reference line RFL is supplied with 3 volts as a reference voltage REF (voltage setting details will be described later). Then, as shown in FIG. 6(F), a voltage pulse as a boosting signal BST is applied to the boosting signal line BSL for each frame period, whereby a refreshing procedure is performed to all of the pixel circuits P(i, j) in one entire screen. The refreshing procedure for one full screen (frame refreshing) constitute one cycle, and as shown in FIG. 4, n cycles of refreshing procedures are performed after the permanent display mode writing period, in the present embodiment (n=59 in the present embodiment). Once the n cycles of refreshing procedures are complete, polarity inversion driving is performed for inverting polarity of the voltage applied to each pixel liquid crystal in the display section 100, i.e. of the voltage applied to the liquid crystal capacitance Clc in each pixel circuit P(i, j). (Details of the polarity inversion drive will be described later.) Thereafter, the polarity inversion drive is performed for each completion of n cycles of full screen refreshing. A specific value of n depends on such factors as liquid crystal deterioration severity caused by repeated application of consistent polarity voltage; acceptable power consumption; etc. In the present embodiment, n=59.

FIG. 7 through FIG. 10 are circuit diagrams for describing operations of the pixel circuit 112 in the permanent display mode writing period and the self-refreshing period according to the present embodiment. In these figures, signal lines and voltage lines are associated with numbers indicating voltage values listed as operating conditions in FIG. 3. A circle drawn in broken lines means that the associated transistor is in ON state whereas a cross symbol drawn in broken lines means that the associated transistor is in OFF state.

Figure 7:
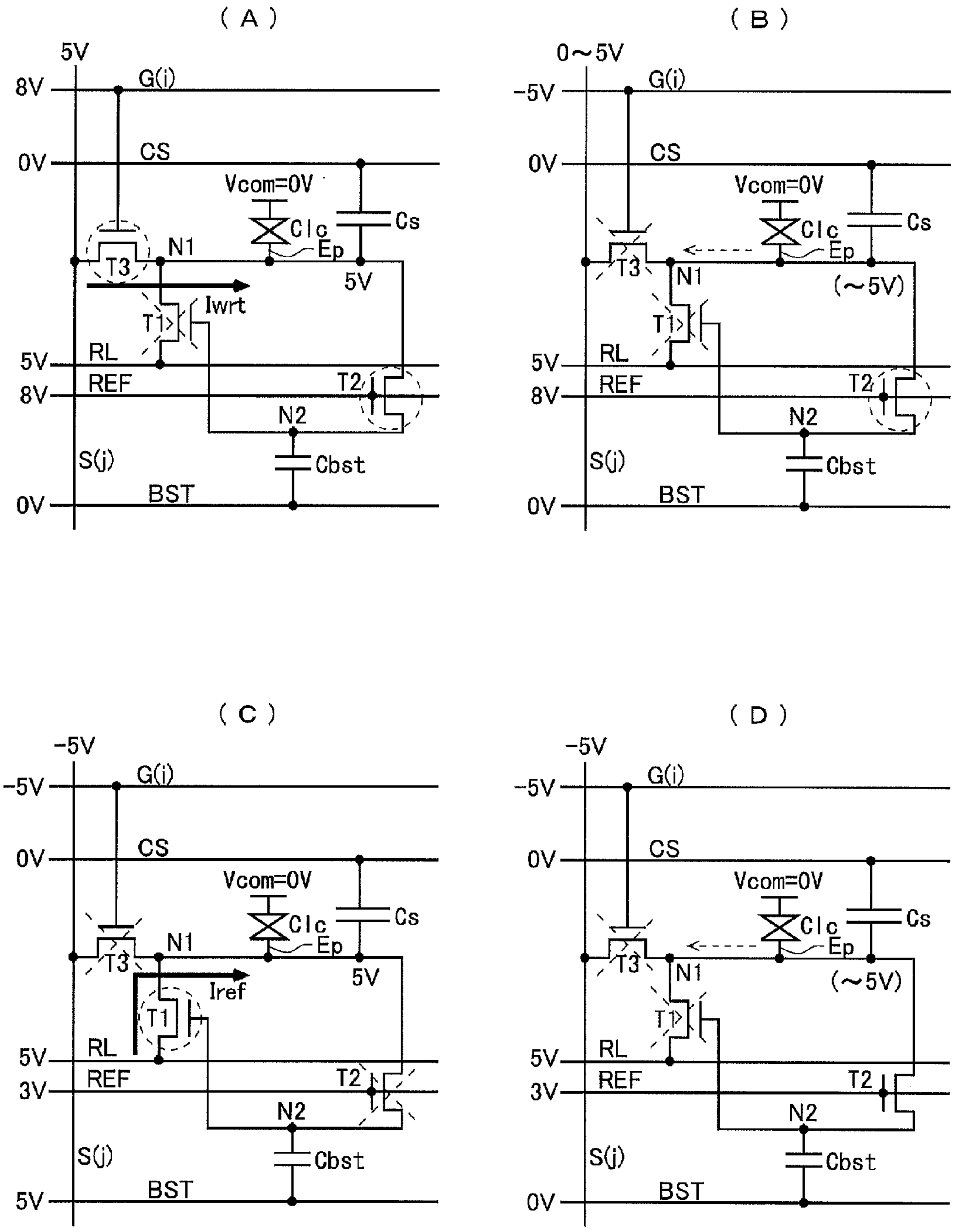
FIG. 7 shows circuit diagrams (A through D) for describing operations when applying a positive high voltage to a pixel liquid crystal in the permanent display mode according to the first embodiment.
Figure 8:
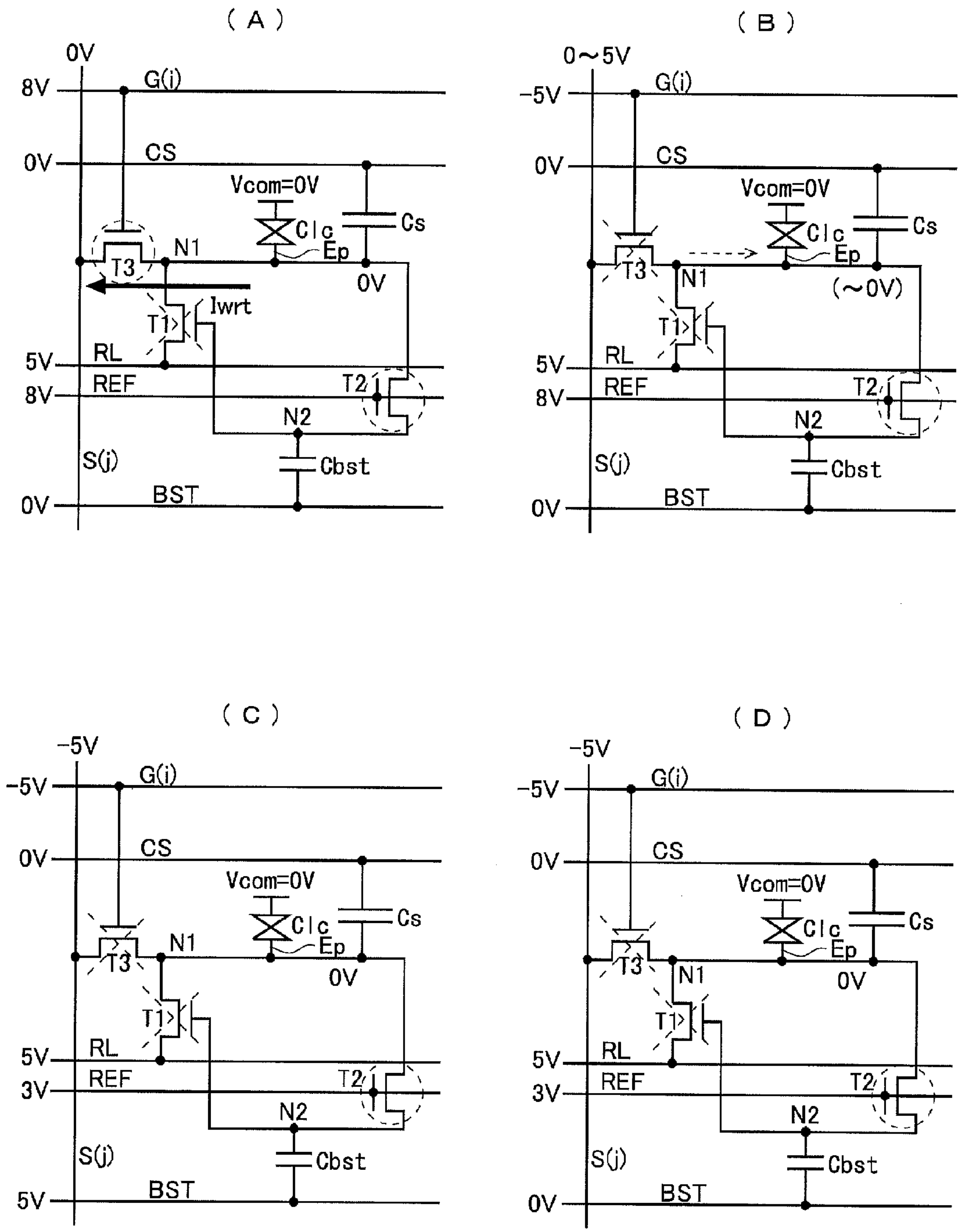
FIG. 8 shows circuit diagrams (A through D) for describing operations when applying a positive low voltage to a pixel liquid crystal in the permanent display mode according to the first embodiment.
Figure 9:
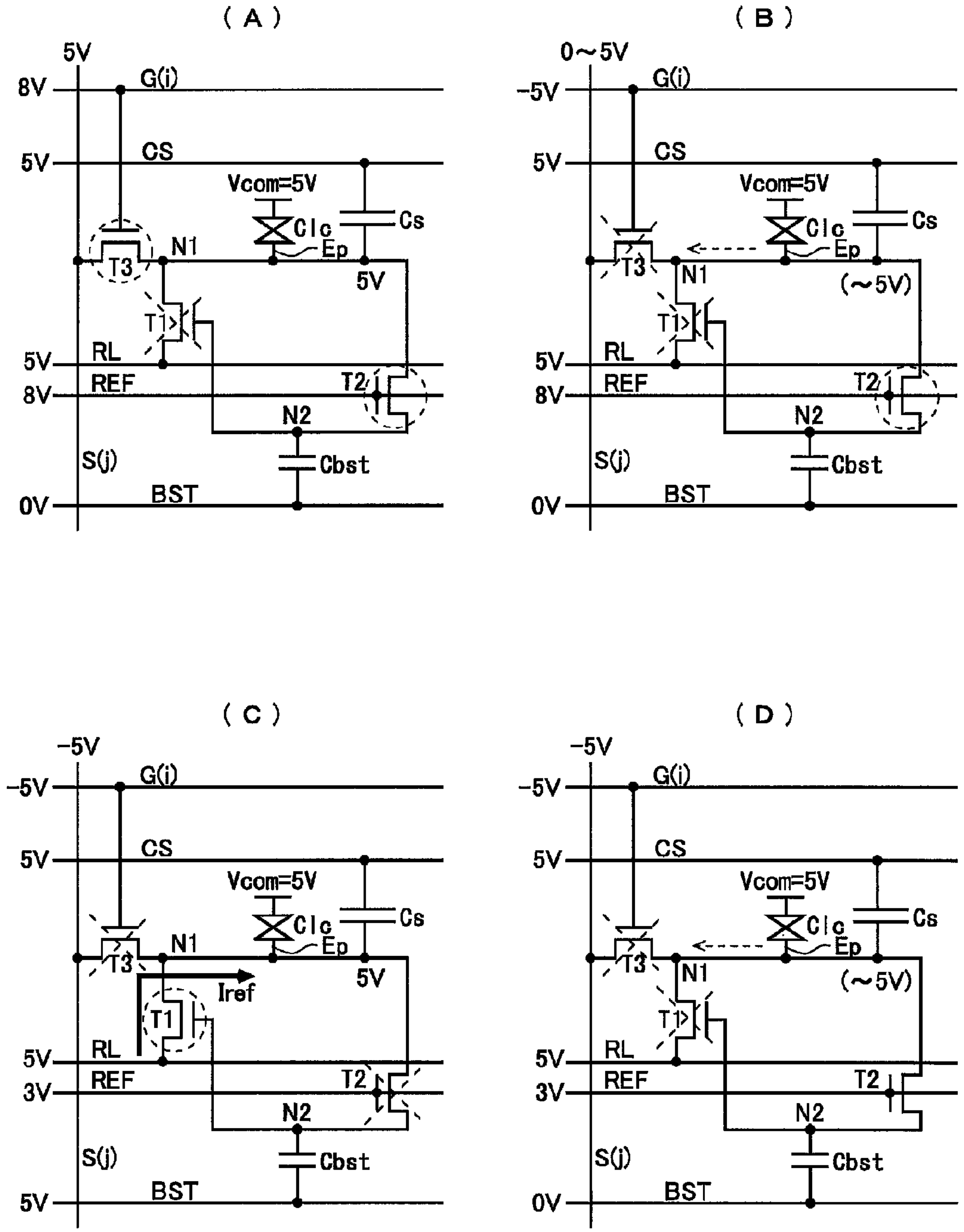
FIG. 9 shows circuit diagrams (A through D) for describing operations when applying a negative low voltage to a pixel liquid crystal in the permanent display mode according to the first embodiment.
Figure 10:
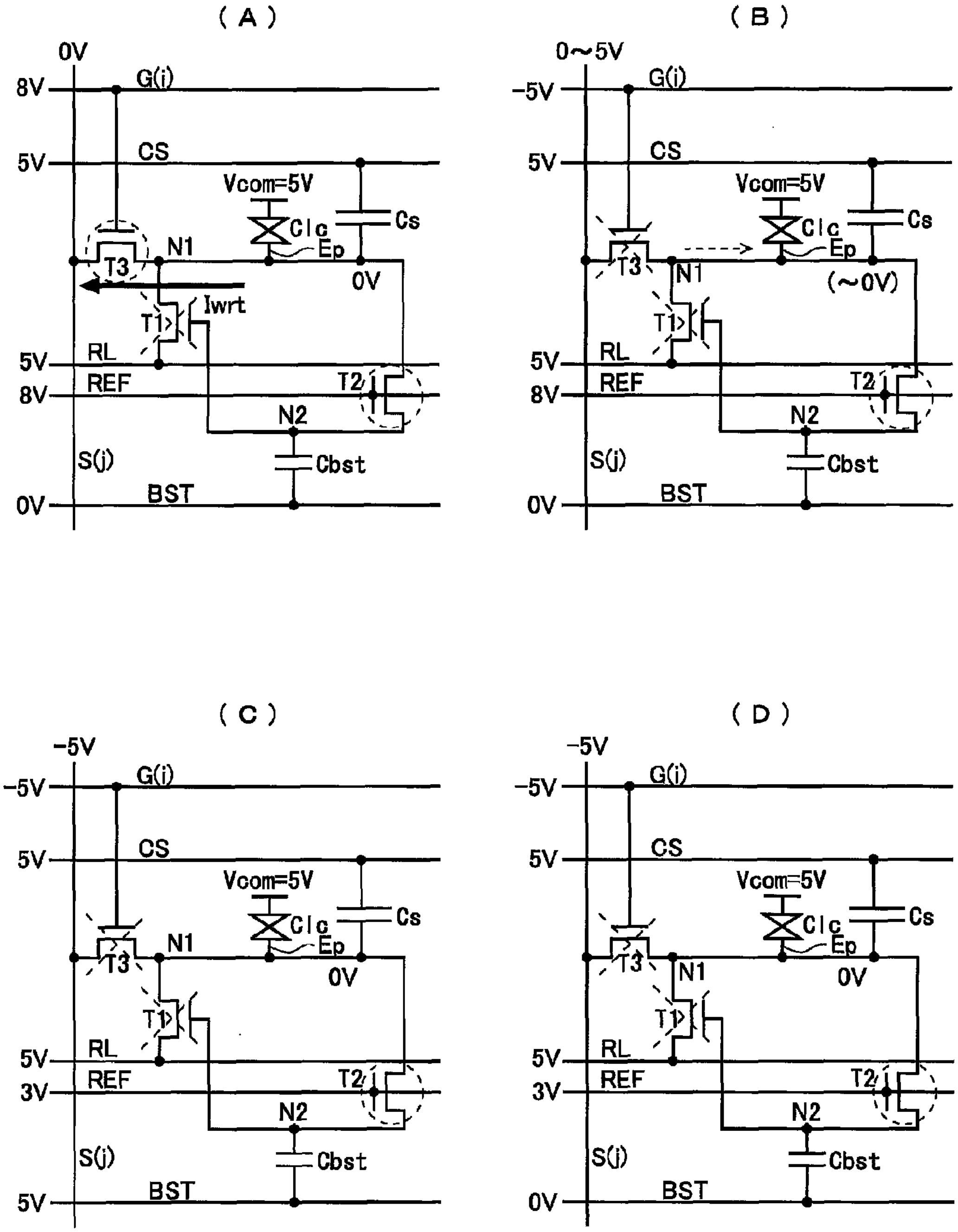
FIG. 10 shows circuit diagrams (A through D) for describing operations when applying a negative high voltage to a pixel liquid crystal in the permanent display mode according to the first embodiment.

FIG. 7 shows a case where the voltage applied to the pixel liquid crystal (voltage applied to the liquid crystal capacitance Clc) is a positive high voltage (5 volts); FIG. 8 shows a case where the voltage applied to the pixel liquid crystal is a positive low voltage (0 volt); FIG. 9 shows a case where the voltage applied to the pixel liquid crystal is a negative low voltage (0 volt); and FIG. 10 shows a case where the voltage applied to the pixel liquid crystal is a negative high voltage (−5 volts). FIG. 7(A), FIG. 8(A), FIG. 9(A) and FIG. 10(A) show the writing operations in the permanent display mode writing period (writing mode); FIG. 7(B), FIG. 8(B), FIG. 9(B) and FIG. 10(B) show the holding operations in the permanent display mode writing period; FIG. 7(C), FIG. 8(C), FIG. 9(C) and FIG. 10(C) show the refreshing operations in the self-refreshing period (self-refreshing mode); and FIG. 7(D), FIG. 8(D), FIG. 9(D) and FIG. 10(D) show the holding operations in the self-refreshing period. It should be noted here that the liquid crystal display device according to the present embodiment is a normally-black type, where display in black is achieved by a liquid-crystal application-voltage having a low voltage value (0 volt), which will be called "L level liquid-crystal application-voltage" and display in white is achieved by a liquid-crystal application-voltage having a high voltage value (5 volts, −5 volts), which will be called "H level liquid-crystal application-voltage". Note, however, that the present invention is not limited to normally-black types.

Hereinafter, reference will be made to FIG. 7 through FIG. 10 to describe operations in the permanent display mode according to the present embodiment. It should be noted here that of all the periods in the permanent display mode, the self-refreshing period is the period when the source driver 300 stops at least its output buffers necessary for outputting data signals S(1) through S(M), and as shown in FIG. 3 and FIG. 6, the source lines SL1 through SLM are supplied with −5 volts as a fixed voltage. The circuit for this may be implemented as an individual component separate from the source driver 300. For example, the circuit can be implemented using a thin-film transistor formed on the active matrix substrate 101 integrally with the pixel circuit 112.

<1.2.1 Operations for Applying Positive High Voltage to Pixel Liquid Crystal>

When a pixel circuit P(i, j) applies a positive high voltage to the pixel liquid crystal, the common voltage Vcom (=CS) is 0 volt as shown in FIG. 7(A). When the scanning signal G(i) is in H level (8V: Activating) and the gate line GL(i) is in the selected state, the third transistor T3 is turned ON to supply the positive H level liquid-crystal application-voltage in the form of a 5-volt data signal S(j) from the source line SLj via the third transistor T3, to the pixel electrode Ep. Thereafter, as the scanning signal G(i) assumes L level (−5V: Deactivating), the pixel voltage Vpix=5V is held at the pixel capacitance Cp as pixel data as shown in FIG. 7(B).

In the permanent display mode writing period, writing and holding of pixel data as described above is performed sequentially to the pixel circuit P(i, j) (j=1 through M) in batch of the pixel circuits belonging to one scanning signal line as a unit; and when pixel data is written and held by the pixel circuit P(N, j) (j=1 through M) in the N-th scanning line, the permanent display mode writing period comes to an end.

Upon completion of the permanent display mode writing period, the self-refreshing period is started to perform a refreshing operation first. In the refreshing operation, all scanning signals G(1) through G(N) assume an L level (−5V), bringing the third transistors T3 into OFF state during the self-refreshing period (FIGS. 7(C) and (D)). Also, during the self-refreshing period, the reference lines RFL are supplied with 3 volts as a reference voltage REF. In the present embodiment, the boosting signal lines BSL, which are formed along respective gate lines GL(i) and then connected with each other, are supplied with the same boosting signal BST (FIG. 1). Specifically, the present embodiment employs a collective refreshing method. For this operation, in the self-refreshing period, a voltage pulse is applied to the boosting signal lines BSL as shown in FIG. 6(F) as the boosting signal BST, for each frame period (1 vertical period: 1V period), i.e. the boosting signal BST assumes H level (5 volts) for each frame period.

Now, with the second transistor T2 having a threshold voltage Vth (>0), consider a relative value Vpix-REF of the pixel voltage Vpix based on the reference voltage REF. If the relative value is greater than −Vth, the second transistor T2 will assume OFF state whereas the second transistor T2 will assume ON state if the relative value Vpix-REF is smaller than −Vth. In the specific situation, the positive H level liquid-crystal application-voltage is a 5-volt data signal S(j), and this is written to the pixel circuit P(i, j) as pixel data. Thus in this pixel circuit, the relative value Vpix-REF in the self-refreshing period is 5−3=2 volts, which is greater than −Vth, and so the second transistor T2 assumes OFF state as shown in FIG. 7(C). Therefore, application of the voltage pulse to the boosting signal line BSL raises the voltage at the node N2, to turn ON the first transistor T1. As a result, the refreshing voltage RL (=5V) is supplied from the refreshing data line RLL via the first transistor T1, to the pixel electrode Ep. Therefore, even if a leak current has caused a voltage drop from the pixel voltage Vpix (i, j) to below the norm voltage (5 volts) of the H level during the period when the boosting signal BST is at the L level (FIG. 7(D)), the H level boosting signal BST causes a current flow Iref as shown in FIG. 7(C), and brings the pixel voltage Vpix(i, j) back to the H level norm voltage (5 volts) (FIG. 6(G)).

As described above, when a pixel circuit P(i, j) is in the state shown in FIG. 7, i.e. when the pixel circuit P(i, j) supplies the pixel liquid crystal with a positive high voltage or when a 5-volt data signal is written as the pixel data, the pixel data is refreshed as shown in FIG. 6(F) since a voltage pulse as a boosting signal BST is applied to the boosting signal line BSL for each predetermined period (for each frame period of 16.7 ms in the present embodiment). Therefore, even if there is a leak current as described above, the pixel voltage Vpix does not drop significantly from the H level norm voltage (5 volts) (FIG. 6(G)), and the voltage applied to the pixel liquid crystal is maintained substantially at the positive H level liquid-crystal application-voltage (5 volts).

<1.2.2 Operations for Applying Positive Low Voltage to Pixel Liquid Crystal>

In the step where a pixel circuit P(i, j) applies a positive low voltage to the pixel liquid crystal, the common voltage Vcom (=CS) is 0 volt as shown in FIG. 8(A), and a 0-volt data signal S(j) which represents the positive L level liquid-crystal application-voltage (0 volt) is applied to the pixel electrode Ep when the scanning signal G(i) is in H level in the permanent display mode writing period. Thereafter, as the scanning signal G(i) assumes L level (−5V), the third transistor T3 turns OFF as shown in FIG. 8(B), and the voltage at the pixel electrode Ep, i.e. the pixel voltage Vpix=0V, is held at the pixel capacitance Cp as pixel data. Thus, the positive low voltage (0 volt) is applied to the pixel liquid crystal of the pixel circuit P(i, j).

In the pixel circuit P(i, j) where the positive L level liquid-crystal application-voltage or a 0-volt data signal S(i) is written as pixel data as described above, the pixel voltage Vpix has a relative value Vpix-REF which is 0−3=−3V based on the reference voltage REF in the self-refreshing period, and is smaller than −Vth (Vth being a threshold voltage of the second transistor and smaller than 3 volts). Therefore, even if the voltage pulse is applied to the boosting signal lines BSL as the boosting signal BST, the second transistor T2 stays ON as shown in FIG. 8(C). Hence, the first transistor T1 stays OFF during the self-refreshing period, and so the refreshing operation as shown in FIG. 7(C) does not take place.

However, the source line SLj keeps its voltage (S(j)) at −5 volts during the self-refreshing period (FIG. 6(B)). For this reason, a voltage which is obtained by dividing the difference between the voltage of the refreshing data line RLL, i.e. the refreshing voltage RL (5 volts), and the voltage of the source line SLj, i.e. the voltage (−5 volts) of the data signal S(j), by a resistance ratio between an off resistance of the first transistor T1 and an off resistance of the third transistor T3 (hereinafter the voltage obtained this way will be called "off-resistance-division voltage") is approximately 0 volt, with the first and the third transistors T1, T3 having substantially the same off resistance. In other words, the off-resistance-division voltage is substantially equal to a positive L level norm voltage (0 volt) at the pixel electrode Ep which is connected to the connecting point (node N1) between the first transistor T1 and the third transistor T3. Therefore, any slight change in the voltage at the pixel electrode Ep, i.e. any slight change in the pixel voltage Vpix, from the positive L level norm voltage (0 volt) during the holding operation in e.g. the writing period (FIG. 8(B)), the change is nullified in the self-refreshing period (FIGS. 8(C) and 8(D)). Also, an equivalent resistance in the pixel liquid crystal is sufficiently smaller (smaller by two orders of magnitude, for example) than the off resistances of the first and the third transistors T1, T3, so leak current in the pixel liquid crystal is negligible in the present embodiment. Therefore, the voltage Vpix of the pixel electrode Ep changes very little during the refreshing period (FIG. 6(H)), and the voltage applied to the pixel liquid crystal stays substantially at 0 volt (positive L level liquid-crystal application-voltage).

As described above, setting the voltage of each source line SLj for the self-refreshing period to −5 volts also makes it possible to suppress pixel voltage creep caused by leak current. Regarding the voltage setting for each source line SLj, a procedure from a more general perspective will be as follows: First, see the two kinds of voltages (0 volt and 5 volts in the present embodiment) which are applied to each source line SLj as data signal S(j) in accordance with the still image to be displayed in the permanent display mode writing period; and then take one which is different from the refreshing voltage RL (5 volts), i.e. take the voltage (0 volt). In other words, of the voltages which are supplied as the data signal S(j) to the pixel electrode Ep, call the higher voltage as a first voltage (5 volts) and the lower voltage a second voltage (0 volt); and then take the second voltage. Then, determine a voltage to be supplied to each source line SLj so that a voltage obtained by dividing the difference between the voltage RL of the refreshing data line RLL and the voltage of the source line SLj by a resistance ratio between the off resistance of the first transistor T1 and the off resistance of the third transistor T3 (off-resistance-division voltage) be approximately equal to the second voltage (0 volt) during the holding operation state in the self-refreshing period. Here is a more general description: If the voltage to be supplied to the pixel electrode Ep takes a plurality of values, make the off-resistance-division voltage value substantially equal to the lowest of these plural values. Such a voltage setting will maintain a voltage at the pixel electrode Ep with very little creep during the self-refreshing period when the pixel electrode Ep, which is supplied with a plurality of voltage values, is supplied with a voltage that is substantially equal to the off-resistance-division voltage.

As a result of combination of the voltage setting for each source line SLj as described above and the refreshing operations as shown in FIG. 7(C), pixel voltage creep due to leak current is suppressed during the self-refreshing period, and therefore the pixel voltage Vpix stay within a predetermined range around the norm voltage (0 volt or 5 volts) (FIG. 6(G) and (H)).

<1.2.3 Operations for Applying Negative Low Voltage to Pixel Liquid Crystal>

In the step where a pixel circuit P(i, j) applies a negative low voltage to the pixel liquid crystal, the common voltage Vcom (=CS) is 5 volts as shown in FIG. 9(A), and a 5-volt data signal S(j) which represents the negative L level liquid-crystal application-voltage (0 volt) is applied to the pixel electrode Ep in the permanent display mode writing period. Accordingly, operations of the pixel circuit P(i, j) in the permanent display mode writing period and the self-refreshing period are as shown in FIG. 9, being virtually the same as of the pixel circuit P(i, j) when applying a positive high voltage to the pixel liquid crystal as shown in FIG. 7, except that the common voltage Vcom is 5 volts.

<1.2.4 Operations for Applying Negative High Voltage to Pixel Liquid Crystal>

In the step where a pixel circuit P(i, j) applies a negative high voltage to the pixel liquid crystal, the common voltage Vcom (=CS) is 5 volts as shown in FIG. 10(A), and a 0-volt data signal S(j) which represents the negative H level liquid-crystal application-voltage (−5 volt) is applied to the pixel electrode Ep in the permanent display mode writing period. Accordingly, operations of the pixel circuit P(i, j) in the permanent display mode writing period and the self-refreshing period are as shown in FIG. 10, being virtually the same as of the pixel circuit P(i, j) when applying a positive low voltage to the pixel liquid crystal as shown in FIG. 8, except that the common voltage Vcom is 5 volts.

<1.2.5 Operations in the Polarity Inverting Period>

In the polarity inverting period according to the present embodiment, essentially the same operations as in the permanent display mode writing period (see FIG. 5, etc.) are performed to replace the voltage of each pixel electrode so that the new voltage has an inverted polarity of the old voltage which has been applied to each pixel liquid crystal. The operation mode for the polarity inverting period will be called “polarity inverting mode”. In this mode, absolute value of the voltage applied to each pixel liquid crystal is not changed before or after the polarity inverting period but the polarity is inversed. Meanwhile, the electronic product which incorporates the liquid crystal display device according to the present embodiment is provided with a memory (hereinafter called “external memory”) which stores image data (at least data for one frame) of a still image to be displayed in the permanent display mode. In the polarity inverting period, the liquid crystal display device according to the present embodiment receives this image data from the external memory, and performs essentially the same operations as the permanent display mode writing operation using the source driver 300, based on pixel data which constitute the supplied image data while taking into account that all operations are performed under the polarity inverting scheme. It should be noted here that if the source driver 300 includes a memory which is capable of storing at least one frame-full of image data, this memory may be utilized instead of the external memory, as a storage of the image data of the still image.

The present embodiment utilizes counter AC driving method in which voltage inversion is performed in such a way that all voltages applied to the pixel liquid crystals have the same polarity within the same frame. For this reason, the common voltage Vcom and the voltage CS of the CS lines CSL are changed when starting the polarity inverting period. Specifically, if, for example, the common voltage Vcom (=CS) is 0 volt as shown in FIG. 5(D) in the permanent display mode writing period, the common voltage Vcom (=CS) stays at 0 volt also in the self-refreshing period which is started immediately after this permanent display mode writing period, and then after this self-refreshing period, the common voltage Vcom (=CS) is changed from 0 volt to 5 volts when the polarity inverting period is started. Thereafter, at the time when the next polarity inverting period is started following the cycles of self-refreshing periods, the common voltage Vcom (=CS) is changed from 5 volts to 0 volt. As understood, the common voltage Vcom (=CS) is alternated between 0 volt and 5 volts every time the polarity inverting period begins, during the permanent display mode.

<1.3 Advantages>

As described above, according to the present embodiment, creep of the pixel voltage Vpix caused by leak current in the pixel circuit 112 is suppressed by the refreshing operations as shown in FIGS. 6(G) and (H), or the creep is nullified by the supply of an off-resistance-division voltage based on the voltage setting for the source line SLj to the pixel electrode Ep. Thus, the pixel voltage Vpix is maintained within a range around the norm voltage (0 volt or 5 volts in the present embodiment) which was utilized at the time of writing, so the voltage applied to each pixel liquid crystal is also maintained at a voltage corresponding to its norm voltage. Therefore, it is now possible to increase the interval between polarity inverting periods in the permanent display mode, within a range that the increase will not cause problems from a perspective of liquid crystal deterioration. The present invention thus makes it possible to perform a polarity inversion drive by the source driver 300 at an interval of 16.7 ms×(59+1)=1000 ms (one second) as in the present embodiment while avoiding poor display quality caused by flickering or decreased contrast. The arrangement achieves sufficient decrease in power necessary for displaying (permanent display of) still images in the permanent display mode while avoiding decrease in display quality. It should be noted here that in the present embodiment, polarity inversion drive interval is 1000 ms (one second) as described above, which is 60 times the refreshing operation interval (the interval for applying the voltage pulse to the boosting signal lines BST=16.7 ms). However, ten-time multiplication for example is sufficient to achieve reduction in power consumption in displaying still images in the permanent display mode.

Also, according to the present embodiment, the only requirement is addition of a simple self-refreshing circuit to a conventional pixel circuit (see FIG. 2). Therefore, pixel circuit configuration is simpler than conventional ones which rely on memories provided in the display section in order to achieve still image display with reduced power consumption. As a result, the present embodiment reduces decrease in aperture ratio, and therefore makes it possible to eliminate brightness drop in the displayed image, and keep high quality display in the normal display mode (e.g. for movie display).

<1.4 Variations of First Embodiment>

Figure 11:
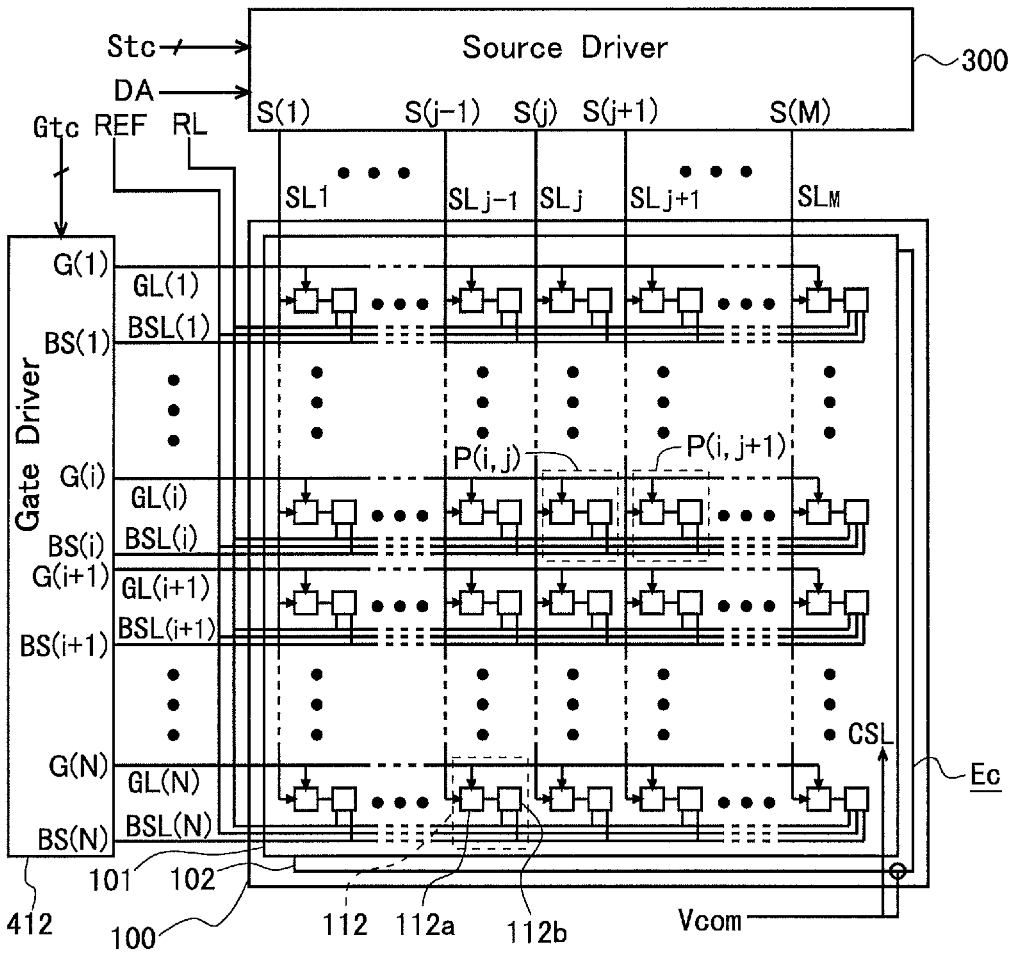
FIG. 11 is a block diagram for describing a variation of the first embodiment.

In the above embodiment, the boosting signal lines BSL which are formed along respective gate lines GL(1) through GL(N) in the active matrix substrate 101 are connected with each other, and then with the display control circuit 200. Alternatively however, as shown in FIG. 11, the boosting signal lines BSL(1) through BSL (N) maybe provided as N, individual control signal lines each formed along one of the gate lines GL(1) through GL(N), and these boosting signal lines BSL(1) through BSL(N) may be controlled individually by a gate driver 412 without connecting the lines with each other. In this case, the gate driver 412 functions as a scanning signal line driving circuit as well as a boost driving circuit, and generates boosting signals BS(1) through BS(N) for application to the respective boosting signal lines BSL(1) through BSL(N), as sequential activation signals. In this case, one cycle of sequential application of the active boosting signals BS(1) through BS(N) to the boosting signal lines BSL(1) through BSL(N) represents refreshing of one screen (frame refreshing). Such a sequential refreshing by individually driving the boosting signal lines BSL(1) through BSL(N) decreases peak current in comparison to cases of collective refreshing by driving one, commonly-connected bundle of boosting signal lines BSL.

According to the embodiment, CS lines CSL which are formed along the respective gate lines GL(1) through GL(N) in the active matrix substrate 101 are connected to each other, and then connected also to the common electrode Ec. The CS lines CSL and the common electrode Ec are supplied with a common voltage Vcom (FIG. 1). Alternatively, however, CS lines CS(1) through CS(N) may be provided as N, individual lines each formed along one of the gate lines GL(1) through GL(N), so that these CS lines CS(1) through CS(N) can be driven individually from each other and separately from the common electrode Ec. The arrangement as the above allows a region of the panel, for example, to display movies in the normal display mode in the embodiment. In other words, partial driving for movie display becomes possible.

In the embodiment, as shown in FIG. 1 and FIG. 11, boosting signal lines BSL or BSL(i) are formed along respective gate lines GL(i). One boosting signal line BSL or BSL(i) which corresponds to one gate line GL(i) is formed as a continuous wire, and can be understood as being shared by all pixel circuits P(i, j) (j=1 through M) in one display line which are connected to this particular gate line GL(i). Also, in the example shown in FIG. 1, the boosting signal lines BSL each formed along one of the gate lines GL(1) through GL(N) are connected with each other, and can be understood as being shared by all the pixel circuits P(i, j) (i=1 through N, j=1 through M). However, the boosting signal lines BSL or BSL (i) are not limited to the above-described configuration. For example, each boosting signal line BSL corresponding to one of the gate line GL(i) may be divided into two potions (into left and right portions). Further, for example, there may be an arrangement that those boosting signal lines BSL which run along odd-numbered gate lines GL(1), GL(3), . . . are connected with each other on one side (on the left side for example) of the active matrix substrate 101 whereas those boosting signal lines BSL which run along even-numbered gate lines GL(2), GL(4), . . . are connected with each other on the other side (on the right side for example) of the active matrix substrate 101. Variations in the configuration of boosting signal lines BSL or BSL(i) have been described but similar variations are also possible to the refreshing data lines RLL and the reference lines RFL.

If the lastly-described variation (division into left and right portions) is used to configure boosting signal lines BSL or BSL(i), refreshing data lines RLL and reference lines RFL, simultaneous display of movies in the normal display mode and of still images in the permanent display mode (partial driving for movie display) in the embodiment becomes easy, which leads to reduced power consumption in image display including movies.

In the embodiment, the refreshing voltage RL supplied from the refreshing data line RLL to the pixel electrode Ep via the first transistor T1 in the self-refreshing period has a voltage which is equal to the voltage of the data signal S(j) (5-volt H level norm voltage) that was supplied to pixel electrode Ep via the source line SLj in the previous permanent display mode writing period or polarity inverting period. Preferably, however, a lower voltage than that of the data signal S(j) is set for the refreshing voltage RL. A reason for this is that the common voltage Vcom receives a correction based on what is called pull-in voltage, and the same correction should be made to the voltage RL in the refreshing data line RLL which works as a video voltage supply line. Specifically, it is preferable that a pull-in voltage caused by parasite capacitance between the gate and drain in the third transistor T3 should be taken into account, and the refreshing voltage RL should be set to a voltage which is lower than the voltage of the data signal S(j) by that pull-in voltage. Additionally, in cases where the voltage of data signal S(j) to be supplied to the pixel electrode Ep in a normally-black type liquid crystal display device is set to a higher voltage than necessary for making white display because of a characteristic which governs a relationship between liquid-crystal application-voltage and brightness, (i.e. in cases of overdrive configuration), the refreshing voltage RL maybe set to a lower voltage which is capable of making white-color display.

2. Other Embodiments

As described earlier, the first embodiment makes use of counter AC driving method. However, the present invention is not limited to this. An example of other driving methods which maybe employed is to fix the potential at the common electrode Ec while changing the potential in the CS lines CSL so that the potential difference between the pixel electrode Ep and the common electrode Ec will be increased after the voltage of the data signal S(j) has been supplied to the pixel electrode.

In the first embodiment, polarity inversion of the voltage applied to the liquid crystal is performed by line inversion method in the normal display mode, and by frame inversion method in the permanent display mode as already described. However, the present invention is not limited to such a configuration as this. For example, line inversion method may be used in both of the normal display mode and the permanent display mode, or frame inversion driving method may be used in both of the normal display mode and the permanent display mode.

In the first embodiment, each pixel circuit 112 can only make two kinds of display, in black (OFF state) or in white (ON state). However, gradation display based on area coverage modulation is also possible by using two or a greater predetermined number of adjacent pixel circuits P(i, j) as a display unit.

Figure 12:
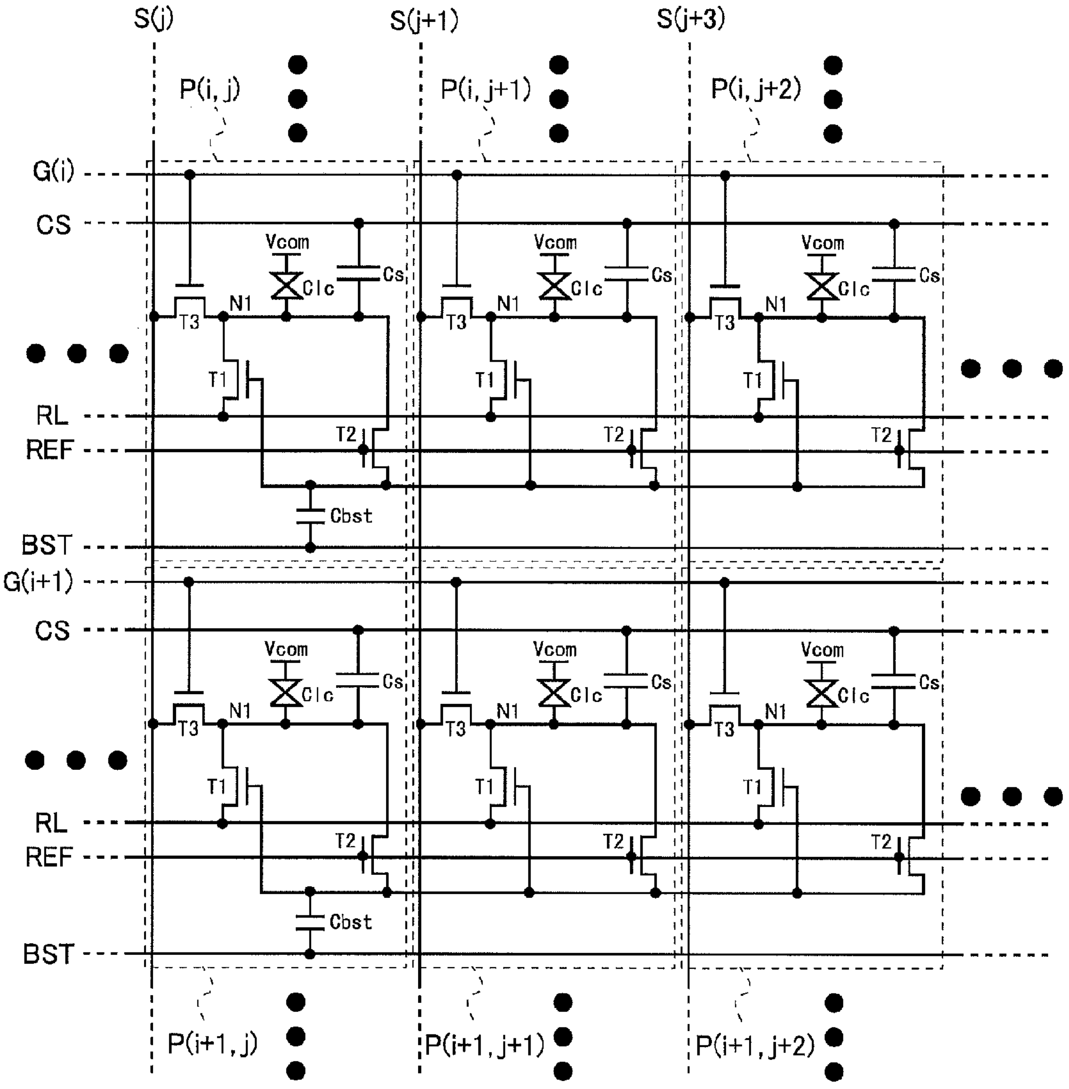
FIG. 12 is a circuit diagram for describing another variation of the first embodiment.

In the first embodiment, a boosting capacitance element Cbst is provided for each pixel circuit 112 for refreshing operation in the pixel circuit 112. Alternatively, however, a boosting capacitance element Cbst may be provided for two or a greater predetermined number of pixel circuits 112. For example, in a color display configuration where three pixel circuits P(i, j), P(i, j+1), P(i, j+2) constitute a display unit for R (red), G (green) and B (blue) pixels respectively, if permanent display mode only requires two-tone, black-and-white images to be displayed, the three pixel circuits P(i, j), P(i, j+1), P(i, j+2) may share one boosting capacitance element Cbst as shown in FIG. 12. Such a configuration as described has a better aperture ratio than the first embodiment, making it possible to reduce decrease in brightness caused by the added self-refreshing function.

In the first embodiment, every pixel circuit 112 formed in the active matrix substrate 101 has an arrangement for self-refreshing function (self-refreshing circuit 112*b*). However, for those liquid crystal display devices such as one disclosed in Patent Literature 1 (JP-A 2007-334224 Gazette) where the display device has two kinds of pixel sections called a transparent pixel section and a reflective pixel section and the reflective pixel section is utilized for making display in the permanent display mode, the arrangement for self-refreshing function may only be provided for the reflective pixel section.

In the first embodiment, the pixel circuit 112 is constituted by using N-channel type thin-film transistors as shown in FIG. 2. However, instead of using N-channel type thin-film transistors, P-channel type thin-film transistors may be utilized. Such a liquid crystal display device using the configuration mentioned above can drive their pixel circuits in the same manner and provide the same advantages as the first embodiment, by performing polarity inversion to the power voltage and to the voltages listed earlier as operating conditions. Further, the present invention does not limit the transistors T1 through T3 in the pixel circuit 112 to the thin-film transistors as mentioned above. Other active elements than thin-film transistors may be used as constituent elements of the pixel circuit 112.

Figure 13:
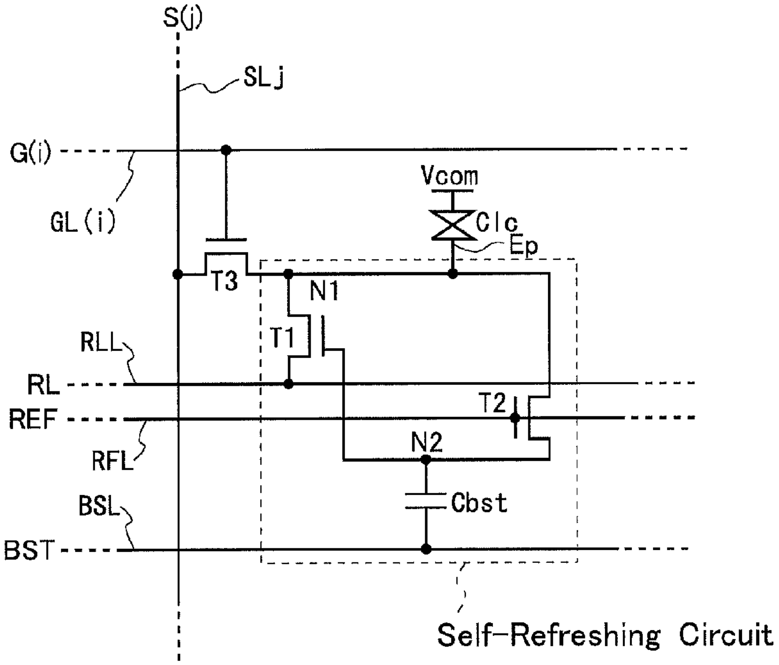
FIG. 13 is a circuit diagram showing a configuration of a pixel circuit in a case where the present invention is applied to a different liquid crystal display device.
Figure 14:
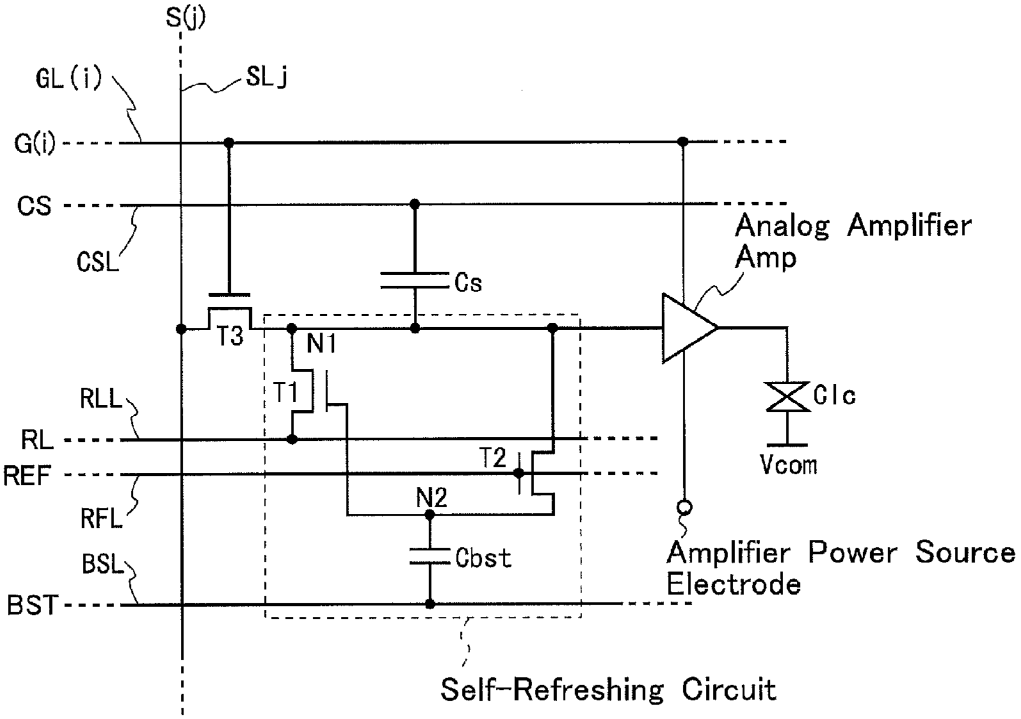
FIG. 14 is a circuit diagram showing a configuration of a pixel circuit in a case where the present invention is applied to still another different liquid crystal display device.

In the liquid crystal display device according to the first embodiment, the pixel capacitance Cp for holding the pixel data in the pixel circuit 112 is constituted by the liquid crystal capacitance Clc and the auxiliary capacitance Cs. However, there may be different configurations such as shown in FIG. 13, where the pixel capacitance Cp consists only of a liquid crystal capacitance Clc (i.e. a configuration which does not include an auxiliary capacitance Cs). Specifically, the capacitance for holding pixel data may be constituted by the pixel electrode Ep and the common electrode (counter electrode) Ec opposed thereto via liquid crystal layer. The present invention is also applicable to such a configuration as shown in FIG. 14, where an analog amplifier Amp is incorporated in the pixel circuit, and a voltage which is held as pixel data in an auxiliary capacitance (holding capacitance) Cs is supplied via the analog amplifier Amp, to the pixel electrode Ep which constitutes the liquid crystal capacitance Clc. In this case, the pixel capacitance Cp for holding the pixel data consists only of the auxiliary capacitance (holding capacitance) Cs.

Figure 15:
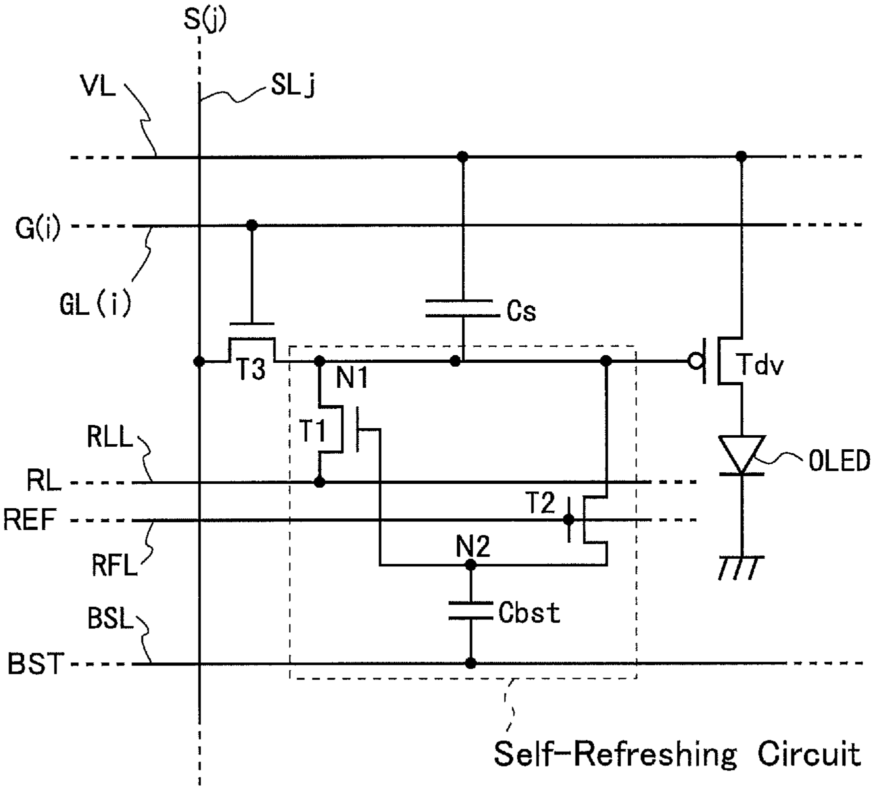
FIG. 15 is a circuit diagram showing a configuration of a pixel circuit in a case where the present invention is applied to an organic EL display device.

Although the first embodiment was described as a liquid crystal display device, the present invention is not limited to this. The present invention is applicable to any display device as far as it has a capacitance which serves as the pixel capacitance Cp for holding pixel data, and display of image is based on a voltage held in this capacitance. For example, the present invention is applicable also to organic EL (Electroluminescenece) display devices in which image display is based on holding a voltage which represents pixel data in a capacitance serving as a pixel capacitance. FIG. 15 is a circuit diagram showing an example of pixel circuit in such an organic EL display device. In this pixel circuit, a voltage held by a holding capacitance Cs as pixel data is supplied to a gate terminal of a driving thin-film transistor Tdv, and a current in accordance with this voltage flows from a power source line VL, via a driving thin-film transistor Tdv, to a light-emitting element OLED. Therefore, the holding capacitance Cs is the equivalent to the pixel capacitance Cp in the first embodiment. It should be noted here that in the pixel circuits shown in FIG. 13, FIG. 14 and FIG. 15, components which are identical with or equivalent to those of the pixel circuit 112 (FIG. 2) in the first embodiment are indicated by the same reference symbols. Each of these pixel circuits has a self-refreshing circuit including the first and the second transistors T1, T2 and the boosting capacitance element Cbst.

INDUSTRIAL APPLICABILITY

The present invention is applicable to display devices and their pixel circuits, and particularly advantageously to liquid crystal display devices and their pixel circuits which are suitably used for portable information terminals such as mobile phones.

LEGEND

100 Display section
101 Active matrix substrate
102 Counter substrate
112 Pixel circuit
112*a* Main circuit
112*b* Self-refreshing circuit
200 Display control circuit
300 Source driver (data signal line driving circuit)
410 Gate driver (scanning signal line driving circuit)
412 Gate driver (scanning signal line driving circuit, boost driving circuit)
600 Common electrode driving circuit
GL(i) Gate line (i=1 through N) (scanning signal line)
CSL CS lines (fourth wiring)
VL Power source lines (fourth wiring)
BSL Boosting signal lines (second wiring)
BSL(i) Boosting signal lines (i=1 through N) (the second wiring)
RLL Refreshing data line (first wiring)
RFL Reference lines (third wiring)
SLj Source line (j=1 through M) (data signal line)
P(i, j) Pixel circuit (i=1 through N, j=1 through M)
Ep Pixel electrode
Ec Common electrode (counter electrode)
Clc Liquid crystal capacitance
Cs Auxiliary capacitance (auxiliary capacitance element)
Cbst Boosting capacitance element
T1 First transistor (first active element)
T2 Second transistor (second active element)
T3 Third transistor (third active element)
Vcom Common voltage
Vpix Pixel voltage
G(i) Scanning signal (i=1 through N)
CS CS line voltage (CS signal)
BST Boosting signal
BS(i) Boosting signal (i=1 through N)
S(j) Data signal (j=1 through M)
RL Refreshing voltage
REF Reference voltage

The invention claimed is:

1. A display device, comprising:

a pixel circuit for formation of a pixel for an image to be displayed in the display device and including:

a first and a second active element;

a predetermined electrode for formation of a capacitance for holding pixel data;

the predetermined electrode being connected to a predetermined first wiring via the first active element and to a control terminal of the first active element via the second active element, the control terminal of the first active element having a capacitance coupling with a predetermined second wiring, the second active element having a control terminal connected to a predetermined third wiring; and a plurality of data signal lines;

wherein the display device has a first operation mode for a voltage supply from the first wiring to the predetermined electrode, wherein the pixel circuit is connected to one of the data signal lines, and wherein a predetermined voltage pulse is applied to the second wiring, whereby the first active element makes the voltage supply if the second active element is turned OFF based on a voltage value of the predetermined electrode relative to a voltage of the third wiring, in the first operation mode, wherein the voltage of the second wiring when the voltage pulse application is not performed is lower than when the voltage pulse application is performed if the first active element is provided by an N-channel transistor, whereas the voltage of the second wiring when the voltage pulse application is not performed is higher than when the voltage pulse application is performed if the first active element is provided by a P-channel transistor, and wherein voltage settings for the first wiring, for the second wiring including settings for the voltage pulse, and for the third wiring are so made that the first active element is turned on upon presence of the voltage pulse applied to the second wiring while the first active element is turned off upon absence of the voltage pulse applied to the second wiring if the predetermined electrode is supplied with a voltage which lies within a predetermined range set around a reference voltage given by the third wiring, and that the first active element is turned off regardless of the voltage pulse application to the second wiring if the predetermined electrode is supplied with a voltage which lies out of said predetermined range but lies within a different predetermined range.

2. A display device, comprising:

a pixel circuit for formation of a pixel for an image to be displayed in the display device and including:

a first and a second active element;

a predetermined electrode for formation of a capacitance for holding pixel data:

the predetermined electrode being connected to a predetermined first wiring via the first active element and to a control terminal of the first active element via the second active element, the control terminal of the first active element having a capacitance coupling with a predetermined second wiring, the second active element having a control terminal connected to a predetermined third wiring; and a plurality of data signal lines;

wherein the display device has a first operation mode for a voltage supply from the first wiring to the predetermined electrode, wherein the pixel circuit is connected to one of the data signal lines, and wherein a predetermined voltage pulse is applied to the second wiring, whereby the first active element makes the voltage supply if the second active element is turned OFF based on a voltage value of the predetermined electrode relative to a voltage of the third wiring, in the first operation mode, and wherein the third wiring is supplied with a predetermined voltage which is not higher than an upper limit nor lower than a lower limit of a voltage to be supplied to the predetermined electrode for the capacitance to hold pixel data, in the first operation mode.

3. An active matrix display device, comprising:

a pixel circuit provided for formation of a pixel for an image to be displayed in the display device and including:

a first and a second active element;

a predetermined electrode for formation of a capacitance for holding pixel data;

the predetermined electrode being connected to a predetermined first wiring via the first active element and to a control terminal of the first active element via the second active element, the control terminal of the first active element having a capacitance coupling with a predetermined second wiring, the second active element having a control terminal connected to a predetermined third wiring;

a plurality of data signal lines;

a plurality of scanning signal lines crossing the data signal lines, wherein the pixel circuit is connected to one of the scanning signal lines and to one of the data signal lines, the pixel circuit further including a third active element having a control terminal connected to the scanning signal line, the predetermined electrode in the pixel circuit being connected to the data signal line via the third active element; and a first operation mode for a voltage supply from the first wiring to the predetermined electrode, wherein in the first operation mode:

a deactivation signal is supplied to the scanning signal line connected to the control terminal of the third active element, whereby the third active element is turned off, the data signal lines having a predetermined fixed voltage.

4. The display device according to claim 3, wherein the predetermined electrode is supplied with a voltage which is given by a proportional division of a difference between a voltage of the first wiring and said predetermined voltage by an off resistance of the first active element and an off resistance of the third active element if the first active element is in an off state, in the first operation mode.

5. The display device according to claim 4, wherein said predetermined voltage is set to a voltage value which satisfies a condition that a voltage value given by a proportional division of a difference between a voltage of the first wiring and said predetermined voltage by an off resistance of the first active element and an off resistance of the third active element is approximately equal to the lowest of the voltages to be supplied to the predetermined electrode in order for the capacitance to hold pixel data.

6. The display device according to claim 5, wherein said predetermined voltage is set to a voltage value which satisfies a condition that a voltage value given by a proportional division of a difference between a voltage of the first wiring and said predetermined voltage by an off resistance of the first active element and an off resistance of the third active element is approximately equal to zero.

7. An active matrix display device, comprising:

a pixel circuit provided for formation of a pixel for an image to be displayed in the display device and including:

a first and a second active element;

a predetermined electrode for formation of a capacitance for holding pixel data;

the predetermined electrode being connected to a predetermined first wiring via the first active element and to a control terminal of the first active element via the second active element, the control terminal of the first active element having a capacitance coupling with a predetermined second wiring, the second active element having a control terminal connected to a predetermined third wiring;

a plurality of data signal lines;

a plurality of scanning signal lines crossing the data signal lines, wherein the pixel circuit is connected to one of the scanning signal lines and to one of the data signal lines, the pixel circuit further including a third active element having a control terminal connected to the scanning signal line, the predetermined electrode in the pixel circuit being connected to the data signal line via the third active element; and a second operation mode for supplying the predetermined electrode with data signal which indicates a pixel to be formed by the pixel circuit, wherein in the second operation mode:

an activation signal is supplied to the scanning signal line connected to the control terminal of the third active element, whereby the third active element is turned on, and the predetermined electrode is supplied with the data signal via the data signal line and the third active element when the third active element is in an on state.

8. The display device according to claim 7, wherein the third wiring is supplied with a voltage for turning on the second active element regardless of a voltage supplied to the predetermined electrode, in the second operation mode.

9. The display device according to claim 7, wherein the third wiring is supplied with a voltage for turning off the second active element regardless of a voltage supplied to the predetermined electrode, in the second operation mode.

10. An active matrix display device, comprising:

a pixel circuit provided for formation of a pixel for an image to be displayed in the display device and including:

a first and a second active element;

a predetermined electrode for formation of a capacitance for holding pixel data;

the predetermined electrode being connected to a predetermined first wiring via the first active element and to a control terminal of the first active element via the second active element, the control terminal of the first active element having a capacitance coupling with a predetermined second wiring, the second active element having a control terminal connected to a predetermined third wiring;

a plurality of data signal lines;

a plurality of scanning signal lines crossing the data signal lines, wherein the pixel circuit is connected to one of the scanning signal lines and to one of the data signal lines, the pixel circuit further including a third active element having a control terminal connected to the scanning signal line, the predetermined electrode in the pixel circuit being connected to the data signal line via the third active element; and a third operation mode for replacing the voltage of the predetermined electrode so that polarity of the voltage applied to the capacitance for holding the pixel data is inverted, wherein the scanning signal lines are driven so that the polarity is inverted and the predetermined electrodes are supplied with voltages of the inverted polarity via the data signal lines, in the third operation mode.

11. The display device according to claim 10, wherein the predetermined electrodes are supplied with the voltages of the inverted polarity via the data signal lines so that the voltages have a same polarity within a given frame, in the third operation mode.

12. The display device according to claim 10, having a first operation mode for a voltage supply from the first wiring to the predetermined electrode, wherein the pixel circuit is connected to one of the data signal lines, wherein a predetermined voltage pulse is applied to the second wiring, whereby the first active element makes the voltage supply if the second active element is turned OFF based on a voltage value of the predetermined electrode relative to a voltage of the third wiring, in the first operation mode, and wherein a time interval for the polarity inversion in the third operation mode is longer than ten times of a time interval for the voltage pulse application in the first operation mode.

13. The display device according to claim 10, wherein the predetermined electrodes are supplied with pixel data stored in a predetermined memory as a representation of at least one frame-full of image data, as voltages of the inverted polarity via the data signal lines and the third active elements, in the third operation mode.

14. An active matrix display device, comprising:

a pixel circuit provided for formation of a pixel for an image to be displayed in the display device and including:

a first and a second active element;

a predetermined electrode for formation of a capacitance for holding pixel data;

the predetermined electrode being connected to a predetermined first wiring via the first active element and to a control terminal of the first active element via the second active element, the control terminal of the first active element having a capacitance coupling with a predetermined second wiring, the second active element having a control terminal connected to a predetermined third wiring;

a plurality of data signal lines;

a plurality of scanning signal lines crossing the data signal lines, wherein the pixel circuit is connected to one of the scanning signal lines and to one of the data signal lines, the pixel circuit further including a third active element having a control terminal connected to the scanning signal line, the predetermined electrode in the pixel circuit being connected to the data signal line via the third active element; and a fourth wiring provided for each of the scanning signal line, each fourth wiring having a capacitance coupling with each predetermined electrode in those pixel circuits connected to the scanning signal line which corresponds to said fourth wiring.

* * * * *